(12) United States Patent
Kazemkhani

(10) Patent No.: US 12,497,115 B2
(45) Date of Patent: Dec. 16, 2025

(54) VERSATILE, MODULAR, AND STACKABLE FOUR-WHEELED MOBILE PLATFORM VEHICLE

(71) Applicant: Ali Kazemkhani, Burnaby (CA)

(72) Inventor: Ali Kazemkhani, Burnaby (CA)

( * ) Notice: Subject to any disclaimer, the term of this patent is extended or adjusted under 35 U.S.C. 154(b) by 0 days.

(21) Appl. No.: 18/631,550

(22) Filed: Apr. 10, 2024

(65) Prior Publication Data
US 2024/0262439 A1    Aug. 8, 2024

(51) Int. Cl.
| | |
|---|---|
| *B62D 63/02* | (2006.01) |
| *B60P 3/42* | (2006.01) |
| *B62D 47/00* | (2006.01) |
| *B62D 51/02* | (2006.01) |
| *B62J 43/16* | (2020.01) |

(Continued)

(52) U.S. Cl.
CPC ............. *B62D 63/025* (2013.01); *B60P 3/42* (2013.01); *B60P 3/423* (2013.01); *B62D 47/006* (2013.01); *B62D 51/02* (2013.01); *B62J 43/16* (2020.02); *B62K 5/007* (2013.01); *B62K 5/01* (2013.01); *B62K 5/08* (2013.01); *B62K 5/10* (2013.01); *B62K 7/04* (2013.01); *B62K 15/00* (2013.01); *B62K 15/006* (2013.01); *B60L 2200/24* (2013.01); *B60L 2200/36* (2013.01); *B62K 2005/001* (2013.01); *B62K 2204/00* (2013.01)

(58) Field of Classification Search
CPC .... B62D 63/025; B62D 63/02; B62D 47/006; B62D 51/02; B62K 5/01; B62K 5/027; B62K 5/08; B62K 5/10; B62K 5/007; B62K 5/003; B62K 5/00; B62K 15/006; B62K 15/00; B62K 2204/00; B62K 7/00; B62K 7/02; B62K 7/04; B62K 2005/001; B62K 2005/002; B62J 43/16; B60P 3/42; B60P 3/423; B60P 3/00; B60L 2200/00; B60L 2200/22; B60L 2200/24; B60L 2200/36
USPC .... 280/785, 33.991, 33.992, 33.997, 33.998, 280/775, 124.134, 124.135; 180/65.1, 180/65.51, 208, 24.07
See application file for complete search history.

(56) References Cited

U.S. PATENT DOCUMENTS

| | | | | |
|---|---|---|---|---|
| 2,923,268 A | * | 2/1960 | Fletcher | B60F 3/00 291/28 |
| 7,487,985 B1 | * | 2/2009 | Mighell | B62K 5/027 280/124.126 |

(Continued)

FOREIGN PATENT DOCUMENTS

| | | | | |
|---|---|---|---|---|
| FR | 3124159 A1 | * | 12/2022 | ............. B62J 43/28 |
| WO | WO-2023031365 A1 | * | 3/2023 | ............. B62D 21/10 |

*Primary Examiner* — Keith J Frisby

(57) ABSTRACT

A versatile, modular, and stackable four-wheeled mobile platform vehicle includes a chassis having a substantially flat deck and an in-built compartment for housing battery module(s). The vehicle includes a steering assembly with a steering column configured to be selectively used in a first configuration, a second configuration, or a third configuration. The vehicle further comprises a relatively flat suspension system, and attachment provisions provided on and around the chassis for removably attaching one or more attachments to transform the vehicle into one or more useful vehicle types. The chassis allows mounting of seat(s) in multiple seating configurations. Further, each of the four wheels is motor-controlled, and is coupled to the chassis to support the chassis for rolling on a surface using a pair of control arms.

18 Claims, 24 Drawing Sheets

(51) Int. Cl.
    *B62K 5/007*           (2013.01)
    *B62K 5/01*             (2013.01)
    *B62K 5/08*             (2006.01)
    *B62K 5/10*             (2013.01)
    *B62K 7/04*             (2006.01)
    *B62K 15/00*           (2006.01)
    *B62K 5/00*             (2013.01)

(56) References Cited

U.S. PATENT DOCUMENTS

| | | | | |
|---|---|---|---|---|
| 7,722,063 | B2 * | 5/2010 | Dieziger | B62K 5/10 |
| | | | | 280/124.135 |
| 11,273,883 | B2 * | 3/2022 | Choi | B62K 5/10 |
| 2005/0236202 | A1 * | 10/2005 | Walworth | B62K 15/006 |
| | | | | 180/208 |
| 2009/0038861 | A1 * | 2/2009 | Hammonds | B64F 1/22 |
| | | | | 180/6.2 |
| 2010/0052273 | A1 * | 3/2010 | Crews | B60R 21/13 |
| | | | | 280/33.997 |
| 2012/0139199 | A1 * | 6/2012 | Burns | F41H 7/044 |
| | | | | 280/33.998 |
| 2013/0153314 | A1 * | 6/2013 | Niedzwiecki | B60K 6/46 |
| | | | | 180/65.245 |
| 2013/0192908 | A1 * | 8/2013 | Schlagheck | B62K 3/002 |
| | | | | 180/65.1 |

* cited by examiner

VERSATILE, MODULAR, AND STACKABLE FOUR-WHEELED MOBILE PLATFORM VEHICLE

TECHNICAL FIELD

The present disclosure relates to electric vehicles in general. More particularly to a versatile, modular, and stackable 4-wheeled electric mobile platform vehicle (also referred to as "Utility Personal Transporter (UPT)") transformable into one or more useful vehicle types such as but not limited to an ATV/UTV, a car, a micro truck, or other work vehicles for carrying out different works to meet needs of a user.

BACKGROUND

In and around us different kinds of dedicated vehicles do exist for patrolling and recreational uses, golfing, adaptive mobility, urban commuting, moving loads from one location to another, farm uses, and various other outdoor uses such as snow plowing, and lawn mowing. However, owning one or other such vehicles just fulfills some specific needs of a vehicle owner.

Vehicles used for transportation, maneuvering in and around the city, delivery of goods, and other outdoor uses have taken many different forms in recent years. These vehicles are often dictated by the environment and context of use. Typically, trucks, vans, and other large, motorized vehicles have large cargo areas for carrying loads but they must stay on roads and can be difficult to maneuver through narrow city streets. Further, small carts, trolleys, and hand trucks can assist with short-distance movement and deliveries of smaller loads. Further, typical carts, trolleys, and hand trucks are manually pushed or pulled and have a limited practical travel distance, goods-carrying capability, and limited travel speed.

Further, during disasters and emergencies, normal protocols for the operation of society and the infrastructure of a community usually become challenged. Time is of the essence in providing quick relief by carrying out rescue operations, and delivering timely different goods/products (Eg. food, medications). Deploying large numbers of trucks, relief vans, etc may be highly difficult in such disaster-hit areas. Further, the road conditions may be highly challenging for conventional vehicles to deliver the relief on time at such locations. The availability of the conventional trucks, and relief vans in larger numbers at needed times may be challenging in itself.

Typically, all-terrain vehicle (ATV) is a small open single-rider vehicle having four wheels and generally designed for off-road use on various types of terrain or rough ground. These vehicles travel on low-pressure tires, with a seat that is straddled by the operator, along with motorcycle-like handlebars for steering control. Likewise, a UTV (utility task vehicle) is a slightly larger four-wheel drive vehicle that usually has a conventional steering wheel and provides seating for 2 or 4 people in a side-by-side arrangement. UTVs often have small truck beds and, as a result, are popular among golf course maintenance personnel, parks and recreation departments, and any other users who need to travel over uneven terrain with people and materials. A typical ATV/UTV is usually powered by an internal combustion engine that runs on gasoline or other suitable fuel (e.g. propane, diesel fuel, etc.) The ATV's/UTV's engine is usually coupled to a pair of rear-drive wheels via the engine's drive shaft and an intermediate transmission. Some ATVs/UTVs even include a wheel drive system. Due to the ever-increasing demand to use ATVs as work vehicles, various implements have been designed to convert ATVs into more useful vehicles, such as lawnmowers, log splitters, snowplowers, etc. However, these implements/attachments normally come with significant drawbacks in that duplicate engines need to be needed to run the separate implements that may or may not be pulled by the ATV, which is very costly and needlessly weighs down the ATV. Conventional implements are custom installed and are cumbersome and time-consuming to utilize in that they are required to be bolted onto the ATV engine and have to be completely unbolted and disassembled to operate the ATV in a normal function when not using the implement.

The inventor herein has come up with a versatile, multi-purpose 4-wheeler micro-electric vehicle or a Utility Personal Transporter (UPT) that can be easily transformed into one or more useful vehicle types for carrying out different works such as but not limited to an ATV, a UTV, a micro car, a golf cart, a club cart, an electric wheel barrel, an electric dumper, and a micro truck or other work vehicles to meet various needs of a user. Further, the proposed 4-wheeled electric vehicle is stackable and is therefore well suited for storage, shipment, and delivery to the scene of an emergency or disaster.

BRIEF SUMMARY

Accordingly, it is an object of the present invention to provide a versatile, modular, and stackable four-wheeled mobile platform vehicle that is sturdy, lightweight, and ideal for search and rescue missions, animal farm surveillance, eco-tours, urban commuting, load carrying, and recreational uses.

Another object of the present invention is to provide a versatile, modular, and stackable mobile platform vehicle with four traction-controlled wheels, each wheel controlled by an individual motor. The traction-controlled wheels provide optimum stability and safety, climbing power, and towing capacity. The in-wheel motors offer better braking and stability experience.

Another object of the present invention is to provide a versatile, modular, and stackable mobile platform vehicle that does not require any transmission parts (such as an internal combustion engine running on fuel), thereby decreasing the overall cost and weight of the vehicle.

Another object of the present invention is to provide a versatile, modular, and stackable mobile platform vehicle that's powered by at least one battery module. The use of modular batteries facilitates in power capacity upgradation, and battery replacement in case batteries need to be replaced or power needs upgradation.

Various embodiments of the present invention describe a versatile, modular, and stackable four-wheeled mobile platform vehicle. The vehicle includes a chassis comprising a substantially flat deck with a top surface, the chassis further comprises an in-built compartment for housing at least one battery module therein. The chassis is preferably cuboidal in shape according to an embodiment.

In an embodiment, the vehicle further includes a steering assembly comprising a steering column and a handlebar mounted on the steering column. The steering column is configured to be selectively used in a first configuration, a second configuration, or a third configuration, and the handlebar is positionable at least at a centreline of the chassis, or to the left side of the chassis of the vehicle. The steering column is height adjustable. The first configuration allows the steering column to be tilted at a predefined angle for a seated position ride of the vehicle, the second configuration allows the steering column to be oriented straight at 90 degrees with respect to the chassis for a standing position ride of the vehicle and the third configuration allows the steering column to be completely folded for storage or stackability of the vehicle.

In an embodiment, the handlebar is mounted on the steering column using a carriage slidable along a rail internally mounted within the steering column.

In an embodiment, the steering column of the vehicle comprises a plurality of U-joints, and a plurality of shafts operationally connected to a third bracket which in turn is connected to a tie rod for transferring the steering motion to the wheels. A shaft of the plurality of shafts is selectively slidable into a barrel for adjusting the height of the steering column. A shaft of the plurality of shafts is angularly oriented and operationally connected to the carriage for moving the carriage along the rail within the steering column.

In an embodiment, the steering column is configured to operate in the first configuration, and/or the third configuration at a pivotal connection.

In an embodiment, the vehicle further includes a relatively flat suspension system comprising a shock absorber and a coil spring wound around the shock absorber. The suspension system is configured near each of the four wheels substantially in a horizontal orientation. The suspension system is connected to a control arm of the pair of control arms using a first bracket at its first end and to a second bracket positioned inside and substantially at the centreline of the chassis. The flat suspension system provides higher off-road/on-road capability to the proposed vehicle. The flat suspension system comprises a double wishbone with 120 mm travel.

In an embodiment, the vehicle further includes one or more attachment provisions or points provided on and around the chassis for removably attaching one or more attachments thereon. The one or more attachment provisions are provided in the form of slots, and/or rails to facilitate attachment of the one or more attachments using one or more fasteners. The one or more attachments when coupled to the one or more attachment provisions provided on and around the vehicle to transform the vehicle into one or more useful vehicle types such as an ATV, a UTV, a micro car, a golf cart, a club cart, an electric wheel barrel, an electric dumper, and a micro truck. The attachments are selected from a group of attachments consisting of at least one seat, at least one bumper, one or more fenders for front and rear uses, one or more footsteps, at least one container, a snowplow, a micro car body, a lawnmower, and a stretcher.

In an embodiment, each of the four wheels comprises an in-wheel motor and is motor-controlled, and coupled to the chassis to support the chassis for rolling on a surface (eg. rough roads or urban roads) using a pair of control arms.

In an embodiment, the chassis includes a cover for covering the in-built compartment holding the at least one battery module.

Various advantages and features of the present invention are described herein with specificity so as to make the present invention understandable to one of ordinary skill in the art, both with respect to how to practice the present invention and how to make the present invention.

BRIEF DESCRIPTION OF THE DRAWINGS

The above set forth and other features of the present invention are made more apparent in the ensuing description of the preferred embodiments when read in conjunction with the attached drawings, wherein.

Identical reference numerals in the figures are intended to indicate like parts, although not every feature in every figure may be called out with a reference numeral.

DETAILED DESCRIPTION

Figure 1:
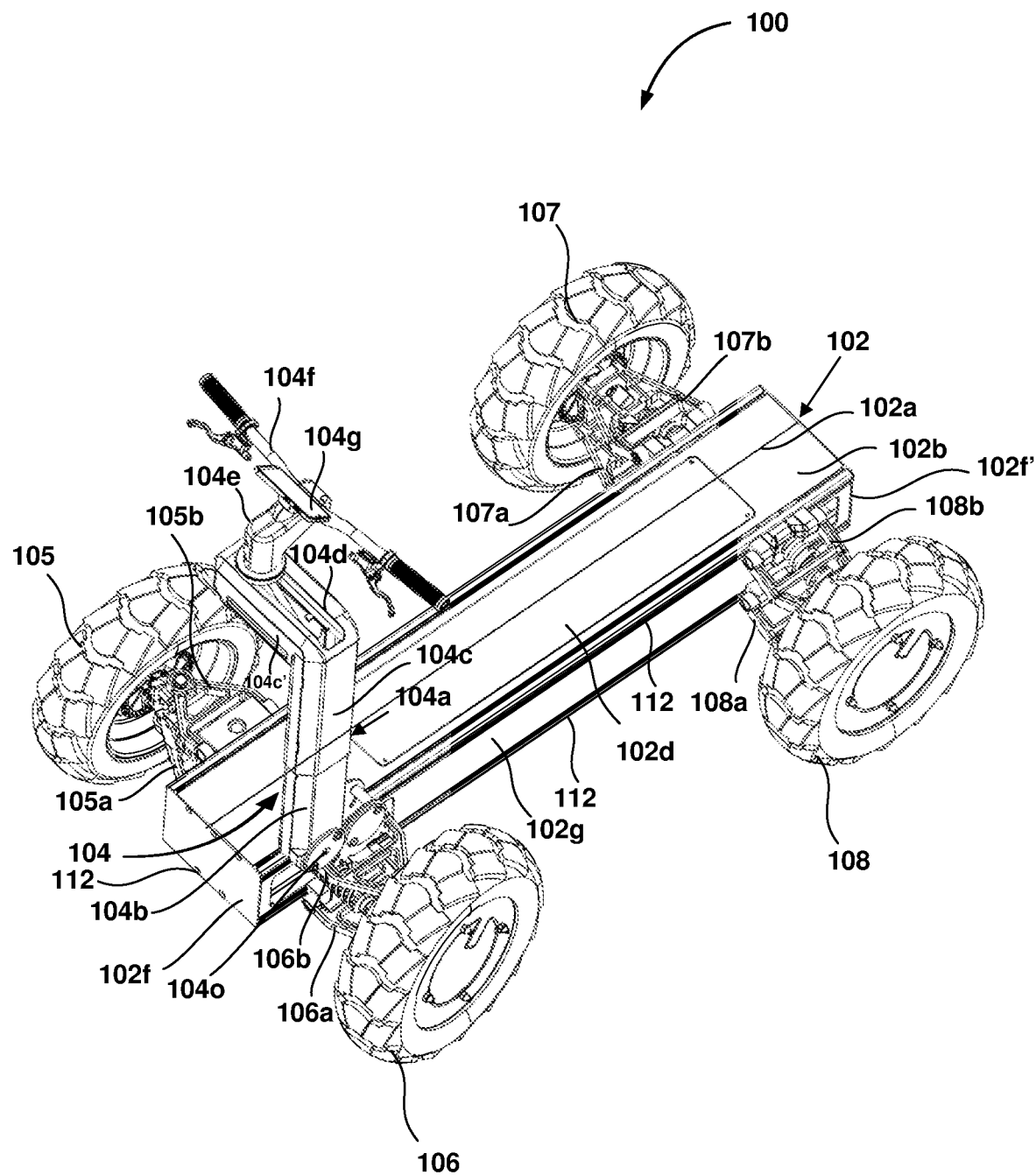
FIG. 1 shows a top perspective view of a versatile, modular, and stackable four-wheeled mobile platform vehicle, according to an embodiment of the present invention.

In the drawings, the relative sizes of elements, layers, and regions may be exaggerated and/or simplified for clarity. Spatially relative terms, such as "beneath," "below," "lower," "under," "above," "upper," "front" and "rear" and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under"

other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and not intended to be limiting. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," "along," and similar terms are merely used as terms of approximation and are intended to account for the inherent variations in measured or calculated values that would be recognized by those of ordinary skill in the art. Further, the use of "may" when describing embodiments of the present invention refers to one or more embodiments of the present invention.

Referring to FIGS. 1-26, particularly to FIGS. 1-13, 15-16, various embodiments of the versatile, modular, and stackable 4-wheeled electric mobile platform vehicle 100 (hereinafter referred to as "vehicle 100" or "a Utility Personal Transporter (UPT) 100"), parts and components associated therewith, and their functionality are shown, which will now be described in detail.

As seen in the figures, the vehicle 100 or a UPT 100 is configured preferably in the form of an all-terrain vehicle (ATV), an open single-rider vehicle having four wheels 105-108 and generally designed for off-road use on various types of terrain or rough ground. Although for the sake of simplification, a seat 120 is not shown in some of the figures (such as in FIGS. 1-3), and in some figures, the seat 120 is shown (such as in FIG. 15-16), it should be understood that ATVs usually have the seat 120 (that can be removably attached) that is straddled by the operator/driver of the vehicle 100, along with motorcycle-like handlebars for steering control.

Figure 2:
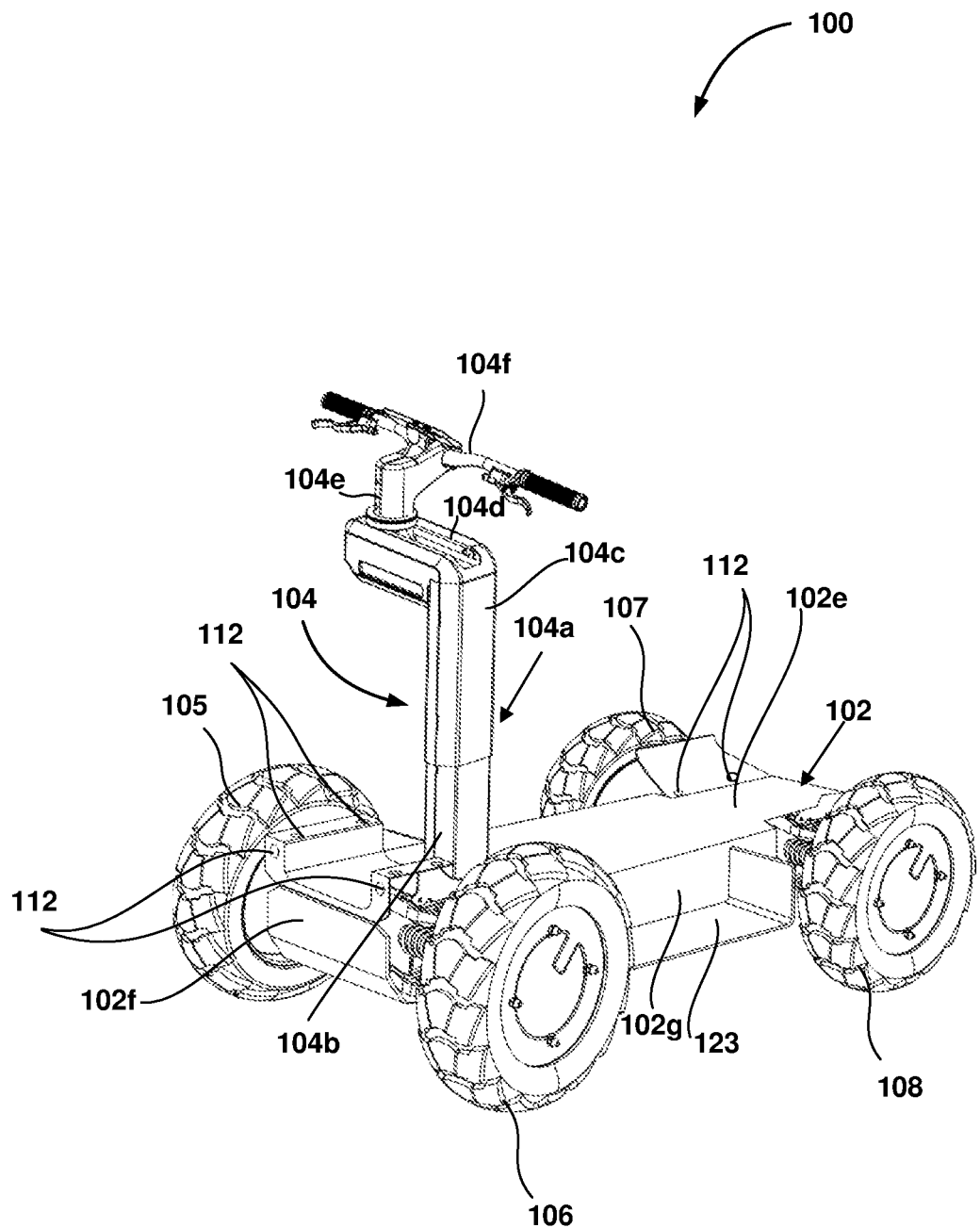
FIGS. 2 and 3 show a side and front perspective view of a versatile, modular, and stackable four-wheeled mobile platform vehicle respectively, according to another embodiment of the present invention.

According to an embodiment, the vehicle 100 includes a chassis 102. The chassis 102 has a substantially flat deck 102a (indicated by a line) with a top surface 102b. The chassis 102 includes an in-built compartment 102c for housing at least one battery module 103 therein. In an embodiment, there can be one or up to eight battery modules 103. The chassis 102 includes a removable cover 102d. The cover 102d is used to conceal or cover the compartment 102c holding the at least one battery module 103. In an embodiment, the chassis 102 is substantially cuboidal in shape and has a front end 102f, a back end 102f', and two sides 102g as seen in FIG. 1. In another embodiment, the chassis 102 may be configured in different other shapes substantially rectangular. In an embodiment, the top surface 102b of the chassis 102 is covered by a mat 102e (FIG. 2). The mat 102e covers/conceals the cover 102d over the compartment 102c to provide a smooth surface and may also make the chassis 102 water resistant.

According to an embodiment, the chassis (102) allows mounting of at least one seat 120 in a plurality of seating configurations. The seating configurations may include but not limited to a side-by-side configuration, a tandem configuration, bench like seating configuration, a lower seating configuration, a saddle seat configuration and so on based on the needs of the vehicle 100 and the form of another useful vehicle to which the vehicle 100 is converted.

Figure 10:
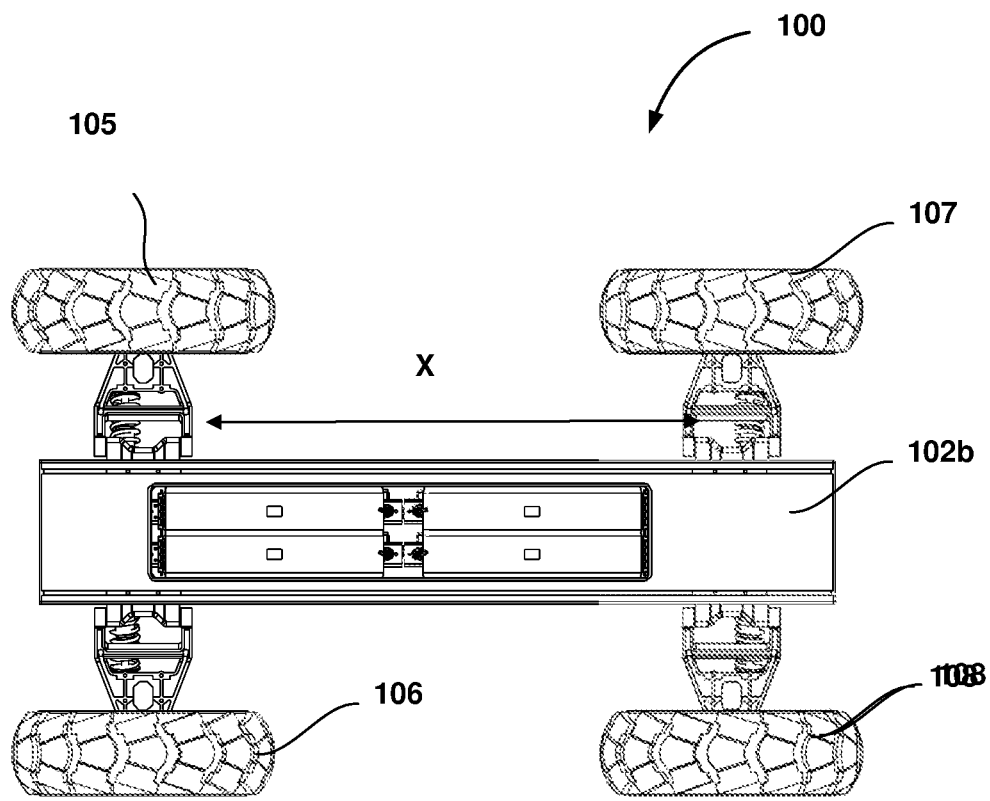
FIGS. 10 and 11 show views of the four-wheeled mobile platform vehicle of FIG. 1 in a simplified form with a cover over the compartment holding at least one battery module removed, according to an embodiment.
Figure 11:
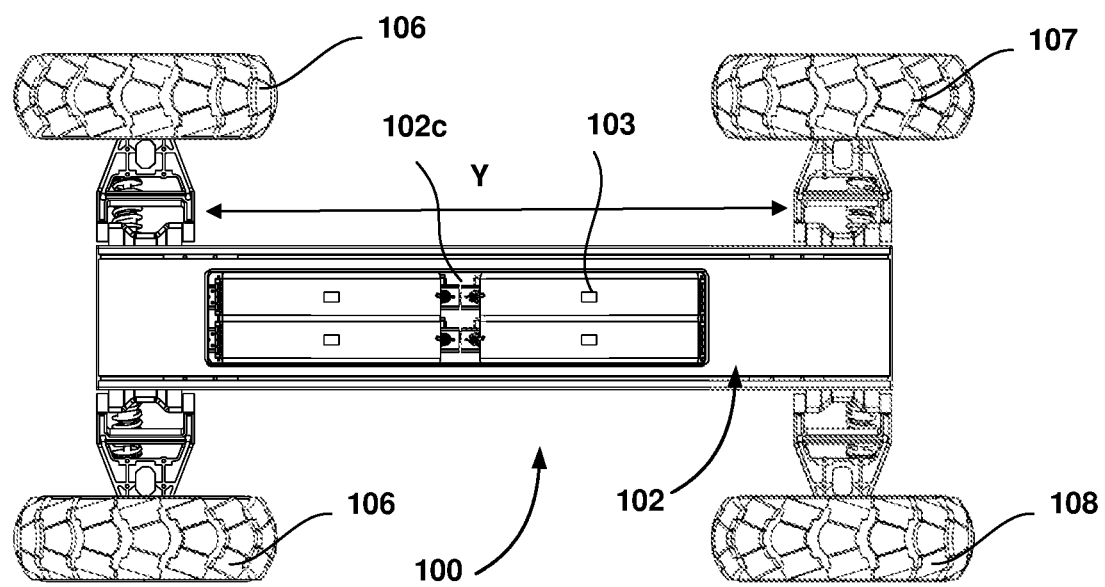

In an embodiment, the chassis 102 has a fixed wheelbase length as seen in at least FIG. 2. In another embodiment, the chassis 102 may be featured to have varying wheelbase length utilizing some mechanics as best seen in FIGS. 10-11 and will be described in the description to follow with respect to FIGS. 12 and 13.

According to an embodiment, besides the chassis 102, the vehicle or a UPT 100 includes a steering assembly 104. The steering assembly includes a steering column 104a, and a handlebar 104f mounted on the steering column 104a. The steering assembly 104 is removably mounted (to the front, left-hand side of vehicle 100) on an upper control arm 106b of the pair of control arms 106a,106b coupled to the chassis 102 of the vehicle 100. However, it should be understood that instead of being mounted on the front, left-hand side of vehicle 100, the steering assembly 104a may be mounted on the front, right-hand side of vehicle 100 on an upper control arm 105b of the pair of control arms 105a,105b coupled to the chassis 102.

Figure 14:
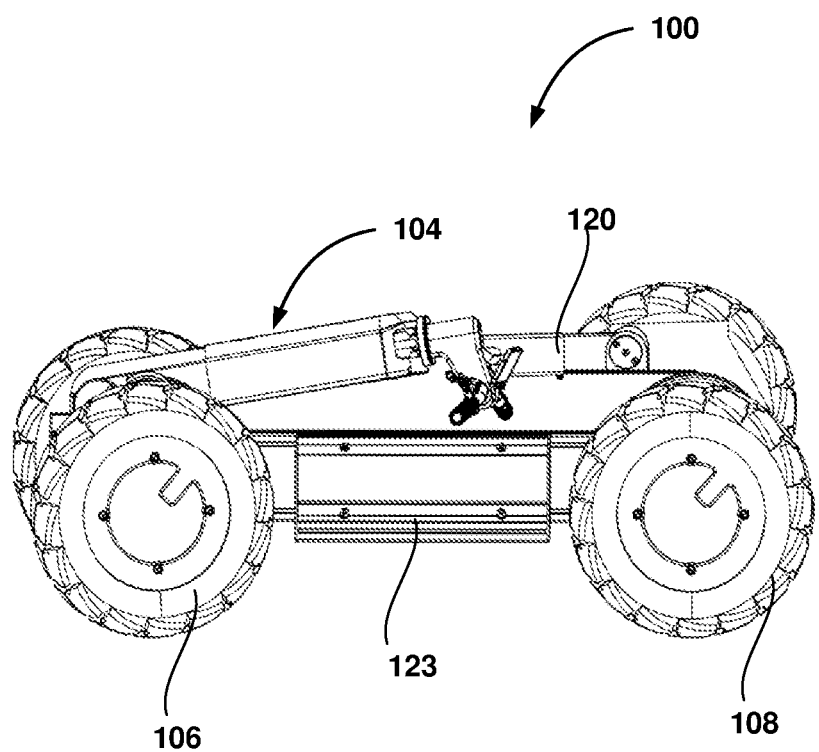
FIG. 14 is a diagram that illustrates the foldability of the four-wheeled mobile platform vehicle of FIG. 2 and/or FIG. 15, according to an embodiment of the present invention.
Figure 15:
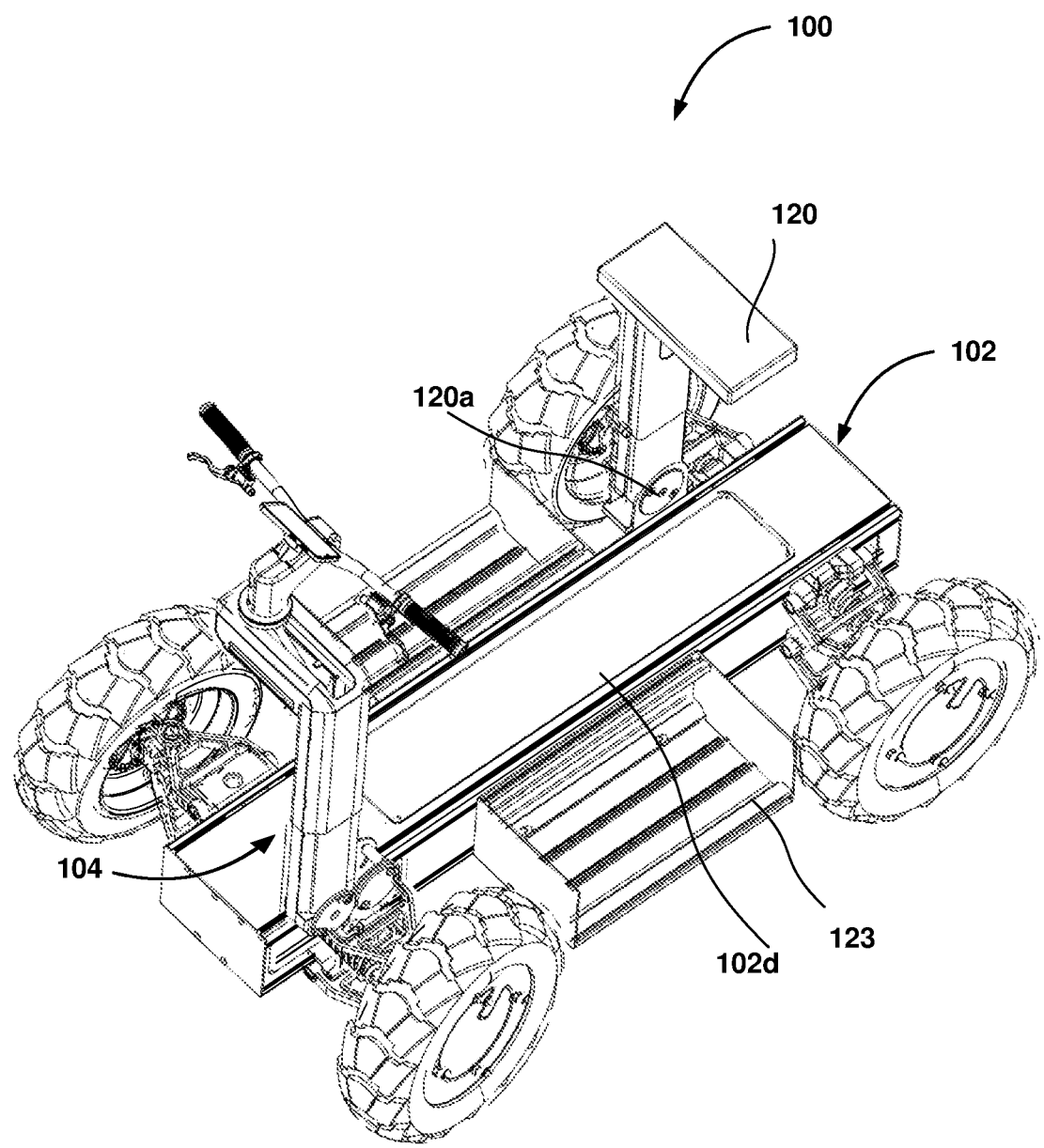
FIG. 15 shows the four-wheeled mobile platform vehicle of FIG. 1 with the footsteps configured on either side of the chassis and a foldable operator's seat configured at the back of the chassis, according to an embodiment.
Figure 16:
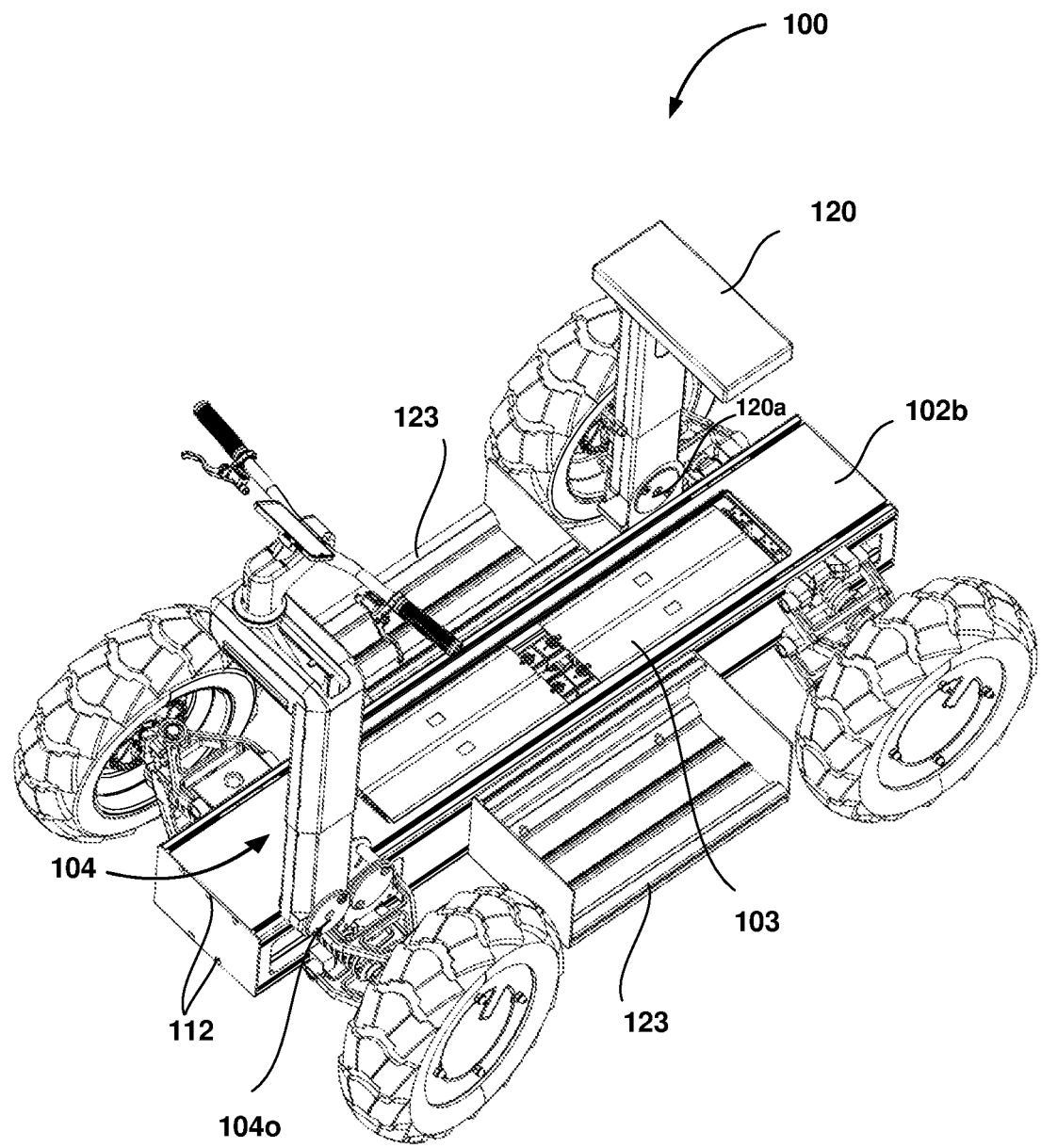
FIG. 16 shows the four-wheeled mobile platform vehicle of FIG. 15 with the cover over the compartment of the chassis holding the least one battery module removed, according to an embodiment of the present invention.
Figure 17:
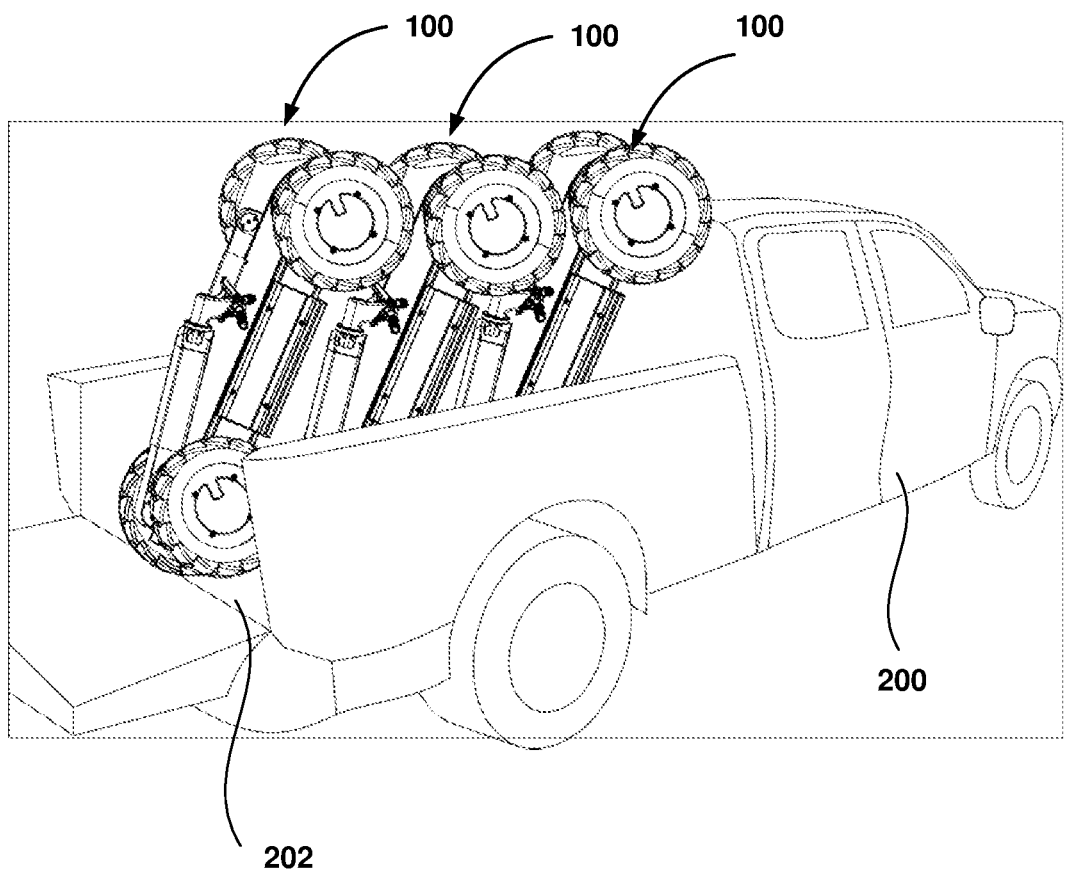
FIG. 17 is a diagram that shows the stack formation after folding the four-wheeled mobile platform vehicle of FIG. 2 and/or FIG. 15 (without the footsteps) at the bed of a truck, according to an embodiment of the present invention.

According to an embodiment, the steering column 104a is configured to be selectively used in a first configuration, a second configuration, or a third configuration. The first configuration allows the steering column 104a to be tilted at a predefined angle (eg. 30 degrees, 40 degrees) for a seated position ride of the vehicle 100. For example, when the vehicle 100 is to be used as a replacement for a small car/micro car for a seated position ride. The second configuration allows the steering column 104a to be oriented straight or perpendicular to the chassis 102 at 90 degrees. This position of the steering column 104a is used mainly for a standing position ride of the vehicle 100, for example, in ATVs. The third configuration allows the steering column 104a to be completely folded for storage or stackability after any attachments 120-128 attached to the one or more attaching points 112 are removed or folded. FIG. 14 shows the vehicle 100 in a folded state, specifically, the steering column 104a, and the operator's seat 120 is shown completely folded to facilitate storage of the vehicle 100. The steering column 104a is completely folded about a pivotal join or connection 104o. Likewise, the standing seat column of the seat 120 is completely folded about a pivotal joint 120a to enable folding of the vehicle 100 as shown in FIG. 14. The folded vehicles 100 can be easily stacked together and transported from one location to another. FIG. 17 typically shows a number of the vehicles 100 folded and stacked at a bed area 202 of a traditional truck 200. Although FIG. 17 shows three vehicles 100 loaded or stacked on the bed 202 of the truck 200, it should be understood that depending on the size of the trucks, the more or less number of vehicles 100 can be transported. The foldability, stackability of the vehicle 100 facilitates any agencies to deploy any number of such vehicles during disasters and emergencies at any location in no time to carry out rescue operations even when the ground surfaces are challenged.

Figure 9:
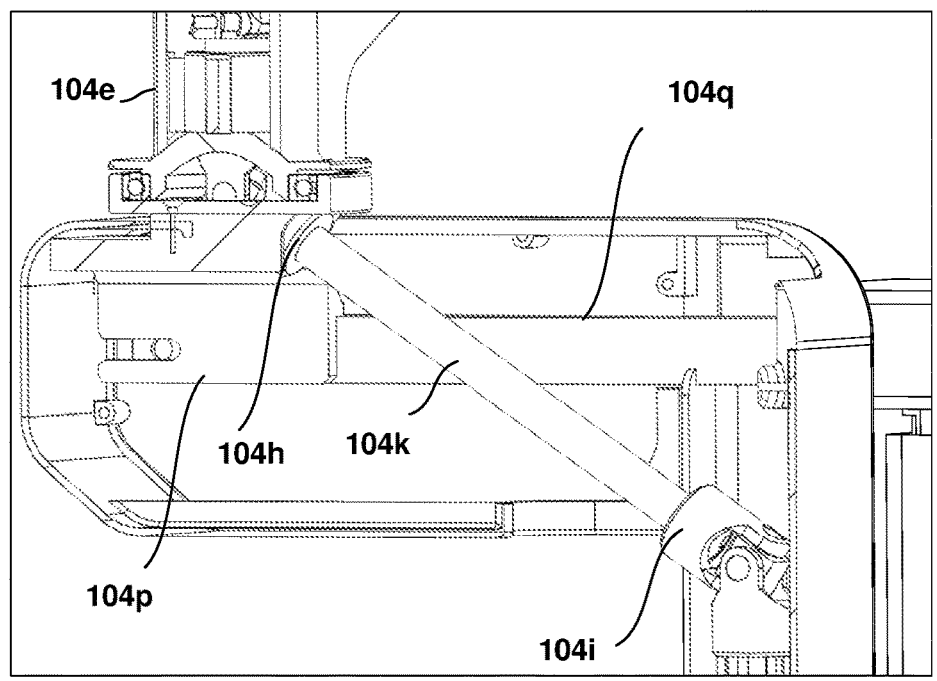

In an embodiment, the handlebar 104f portion of the steering assembly 104 is made offset-able. Meaning, the handlebar 104f is selectively positionable at the centreline of the chassis 102 specially while using the vehicle 100 as an ATV to either ride in a seated position or standing position by a single operator, or to a left side of the chassis 102 of the vehicle 100, if the vehicle 100 is preferably being used as a micro car or small car. In some other embodiment, the handlebar 104f may be slidable to the right side, if the steering assembly 104 is positioned on the front, right-hand side of the vehicle (on the control arm 105b). Particularly, the handlebar 104f is mounted onto the steering column 104a via support 104e attached under the handlebar 104f and that allows the handlebar 104f to rotate in both directions. The support 104e is mounted on a carriage 104p slidable along a rail 104q internally mounted within the steering column 104a as seen in FIG. 9. The cutout section 104d of the column 104a facilitates in sliding of the carriage 104p or support 104e from centreline to the left.

Referring to FIGS. 6-9 in conjunction with FIG. 1 specifically shows partial cross-sectional views of the four-wheeled mobile platform vehicle of FIG. 1 taken from the front to specifically highlight the steering mechanism of the vehicle or UPT 100. As seen the steering column 104a is configured in a L-shaped configuration with portions 104b and 104c. The portion 104c is telescopically configured over the portion 104b to allow height adjustment of the steering column 104a. There is another portion 104c' removably or fixedly connected to the portion 104c. The portion 104c' also includes a cutout section 104d that allows the handlebar 104f mounting on top of the column 104a and allows the handlebar 104f to slide to the centreline or to the left of the vehicle chassis 102. Although the presented embodiment shows and describes a shaft-to-shaft transmission assembly to allow handlebar 104f to slide to the centreline or to the left of the vehicle chassis 102, it is to be understood that the sliding mechanism may be implemented using other different mechanisms. Further, instead of using the sliding mechanism described in the presented embodiment, one can effectively use other methods such as but not limited to at least a chain and sprocket, a belt and pulley system to facilitate changing the position of the handlebar 104f to the centreline or to the left of the vehicle chassis 102.

As seen in FIGS. 6-9, the steering column 104a includes one or more U-joints 104h-104j, and a plurality of shafts 104k-104m. Each of the universal joints or U joints 104h-104j functions to connect two rotating shafts at an angle. In other words, Universal joints make it possible to link two shafts together even if they are not perfectly aligned with one another. They allow the shafts to rotate at different speeds and angles while still transmitting power between them. As known in the art, universal joints or U-joints are commonly used in vehicles to connect the driveshaft to the transmission, as well as in industrial machinery, power tools, and other equipment. The shafts 104k-104m are operationally connected to a bracket 110 which in turn is connected to a tie rod 111 for transferring the steering motion to the wheels 105-108. The shaft 104l is selectively slidable into a barrel 104n to allow adjusting the height of the steering column 104a. As seen, the shaft 104k is angularly oriented and operationally connected to a carriage 104p for moving the carriage 104p along a rail 104q within the steering column 104a.

The steering column 104a is configured to operate in the first configuration (tilted position), and/or the third configuration (completely folded position) at a pivotal connection 104o. The pivotal connection 104o selectively aligns with the U-joint 104j to tilt the steering column 104a at the predefined angle for the seated position ride of the vehicle 100 or completely folded for storage or stackability of the vehicle 100.

Figure 3:
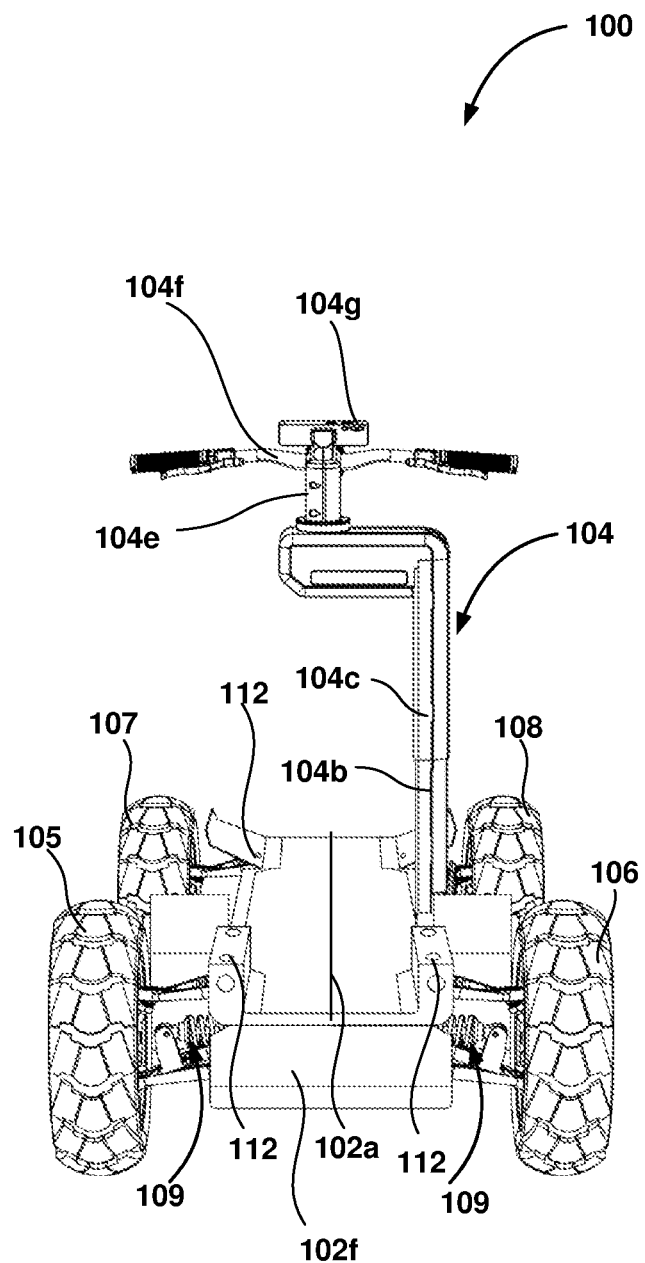
Figure 4:
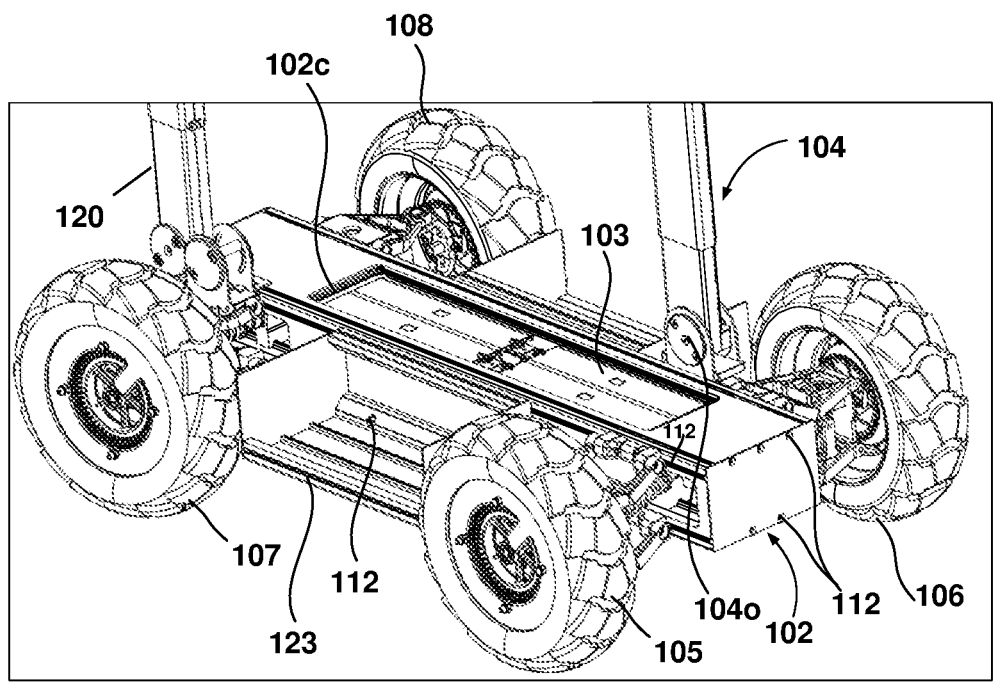
FIG. 4 shows the four-wheeled mobile platform vehicle of FIG. 1 with footsteps configured on either side of the chassis and at least one battery module housed within a compartment of the chassis, according to an embodiment of the present invention.

Further referring to FIGS. 1-3 in conjunction with FIGS. 4-5, the vehicle/UPT 100 further comprises a relatively flat suspension system 109, unlike other prior existing vehicles. The flat suspension system 109 provides better stability, better braking capability, and higher off-road/on-road capability to the proposed vehicle. The flat suspension system 109 comprises a double wishbone (two control arms on two sides) with 120 mm travel. The suspension system 109 includes a shock absorber 109a, and a coil spring 109b wound around the shock absorber 109a. The suspension system 109 is configured near each of the four wheels 105-108 substantially in a horizontal orientation. As seen, each of the suspension systems 109 (at four wheels) is connected to a respective control arm 105a or 106a or 107a or 108a using a respective bracket 105c or 106c or 107c or 108c at its first end and to another bracket 102h positioned inside and substantially at the centreline of the chassis 102. Although only one bracket 102h is shown in the front of the chassis 102, it should be understood that there is going to be another bracket similar to 102h at the back and inside the chassis 102 to support one end of the suspension systems 109 associated with the back wheels 107,108.

Figure 5A:
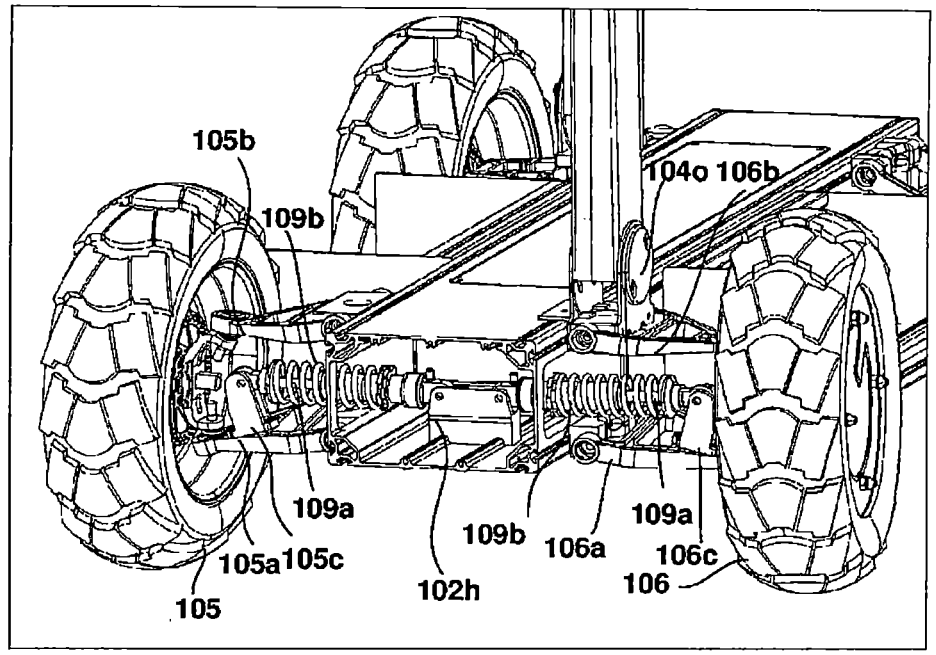
FIGS. 5A and 5B shows a sectional view of the four-wheeled mobile platform vehicle of FIG. 1 highlighting the presence of a flat suspension system and a pair of control arms connected to each of the tires according to various embodiments.
Figure 5B:
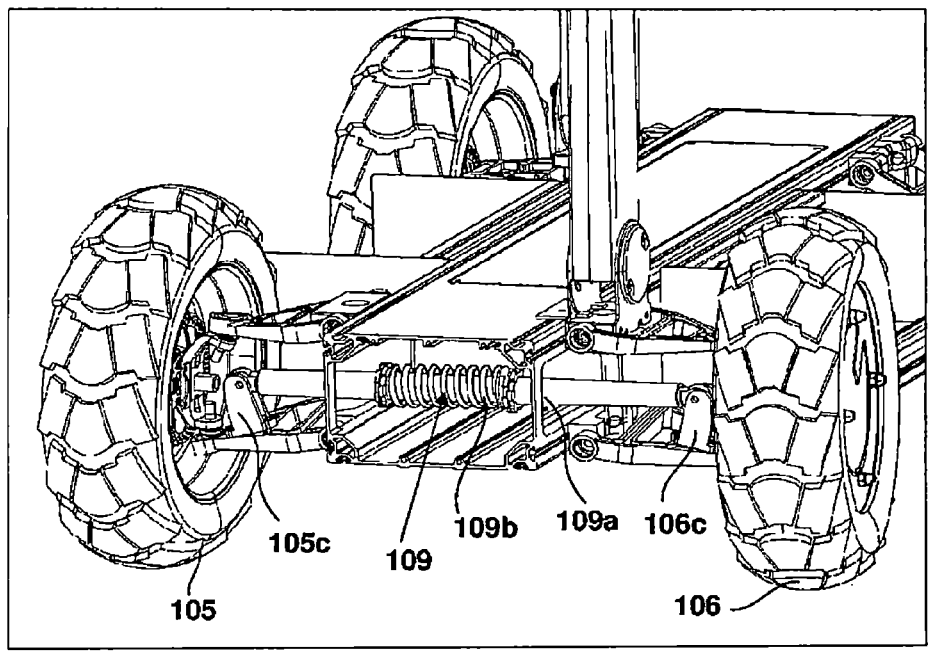
Figure 6:
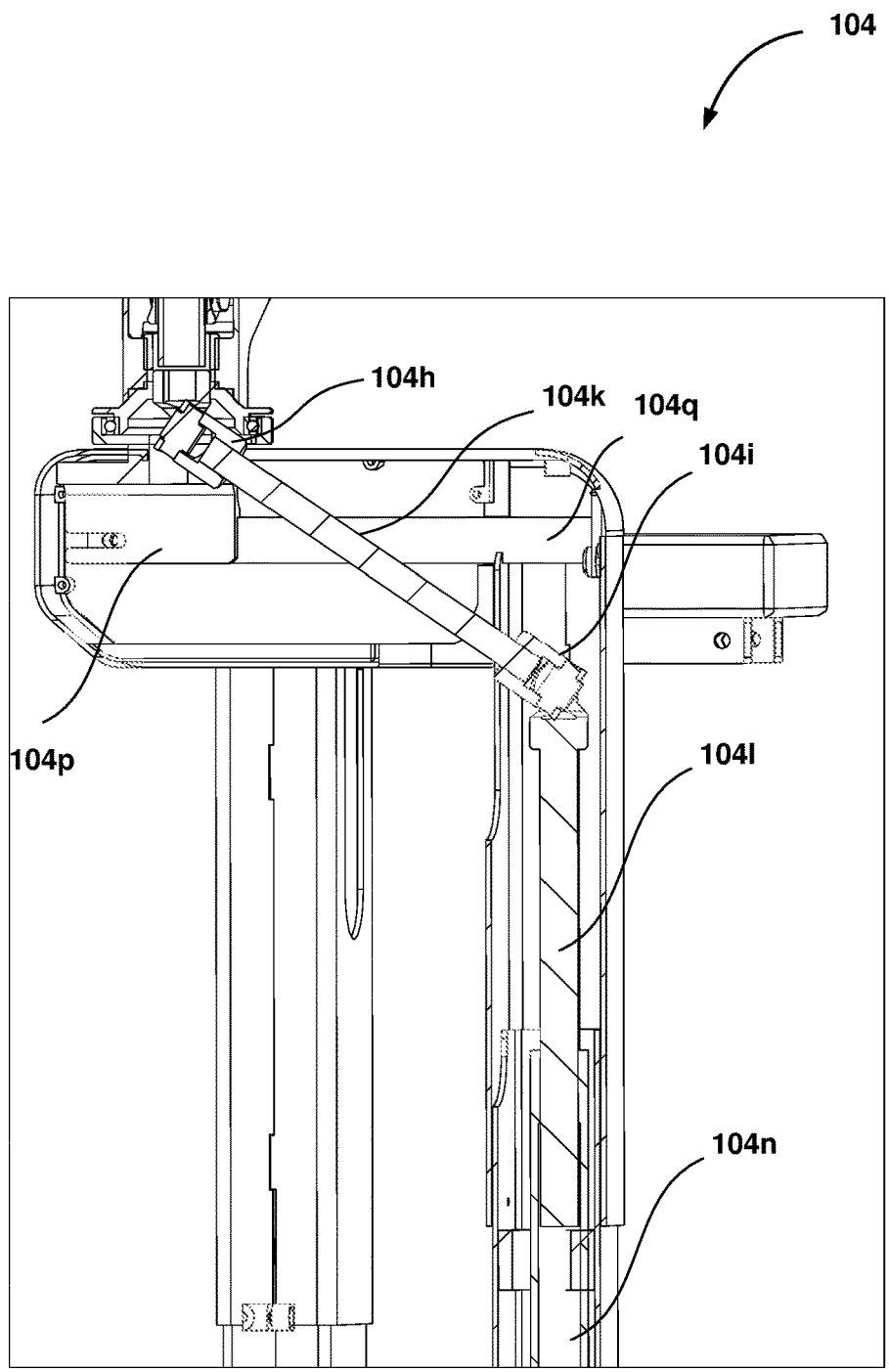
FIGS. 6-9 shows partial cross-sectional views of the four-wheeled mobile platform vehicle of FIG. 1 specifically highlighting the steering mechanism of the vehicle.
Figure 7:
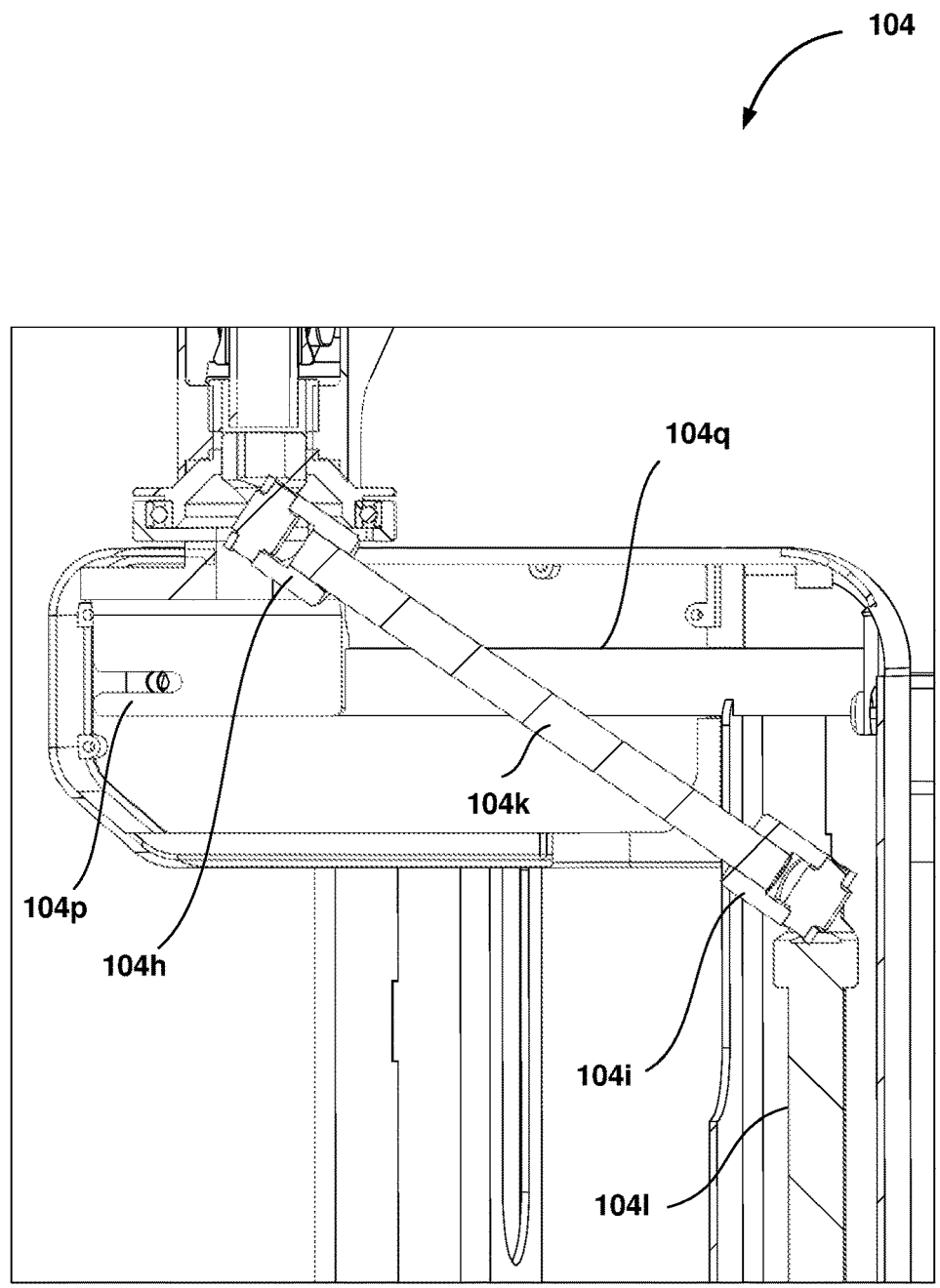
Figure 8:
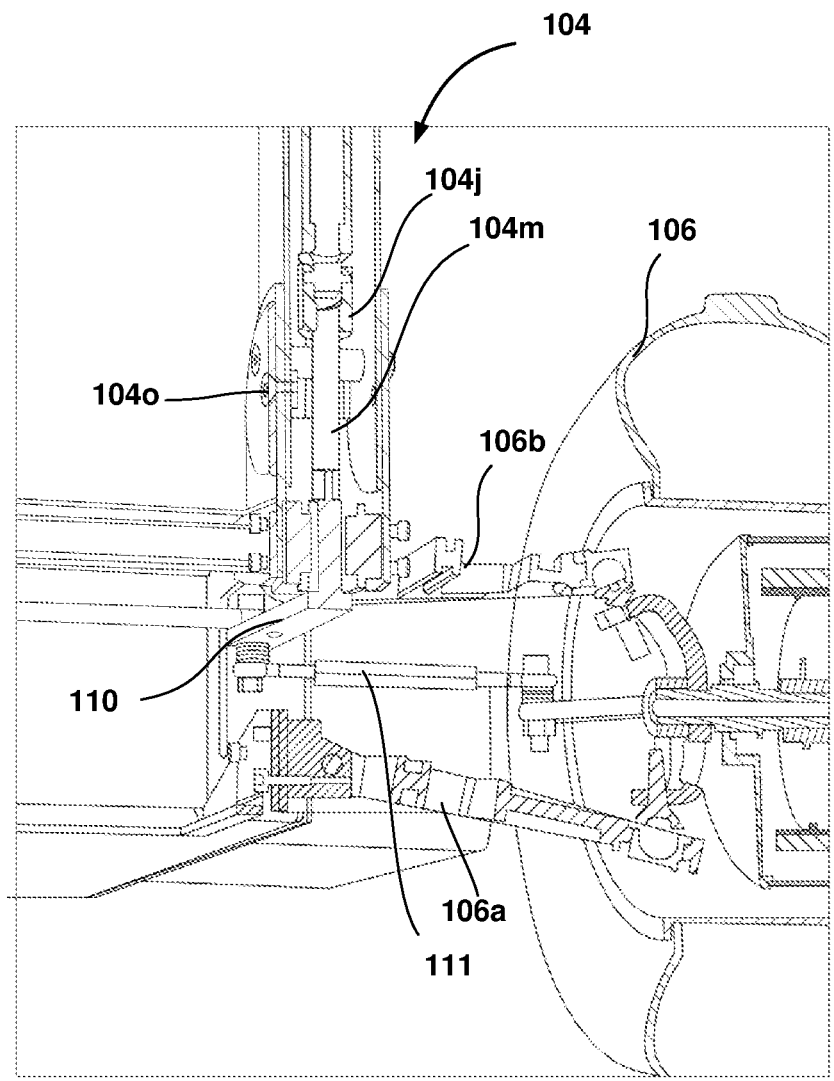

Further, according to another embodiment, as can be seen in FIG. 5B, instead of having 4 suspension systems 109 (FIG. 5A), the vehicle 100 may be provided with two suspension systems, each connecting the front wheels 105, 106 together and the rear wheels 107 together to facilitate tilt steering in the vehicle 100 substantially similar to that offered by an in-line two-wheeled vehicle as best described in U.S. Pat. No. 7,487,985. Although FIG. 5B just shows a single suspension system 109 connecting front wheels 105, 106 using brackets 105c,106c, it should be understood that a similar arrangement for a suspension system is present for rear wheels. The suspension system 109 includes a shock absorber 109a, and a coil spring 109b wound around the shock absorber 109a.

Further, according to an embodiment, the proposed vehicle/UPT 100 with four wheels 105-108 comprises an in-wheel motor (not seen). Each of the in-wheel motors controls and/or drives the respective wheel. Each of the in-wheel motors is coupled to the chassis 102 to support the chassis 102 for rolling on a surface (such as urban terrain, rough roads, and so on). Each of the in-wheel motors is coupled to the chassis 102 using a pair of respective control arms (105a,105b) or (106a,106b) or (107a,107b) or (108a, 108b). The wheels 105-108 are thus traction-controlled wheels and provide stability and safety through regenerative braking, maximum traction, climbing power, and towing capacity to the vehicle 100.

Further, the proposed vehicle/UPT 100 is provided with one or more attachment provisions 112 provided on and around the chassis 102 for removably attaching one or more attachments or implements 120-128 thereon, as at least shown in FIGS. 2 and 4.

Figure 12:
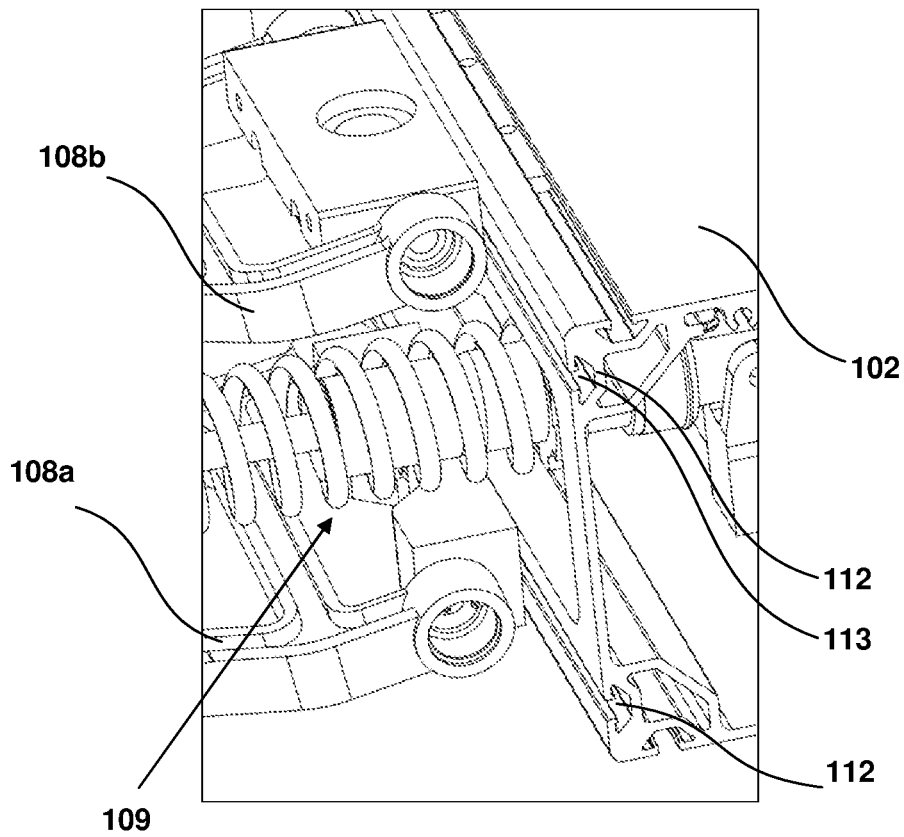
FIGS. 12 and 13 are sectional views taken from FIG. 1 to illustrate a mechanism for changing the wheelbase length of the chassis, in accordance with an exemplary embodiment.
Figure 13:
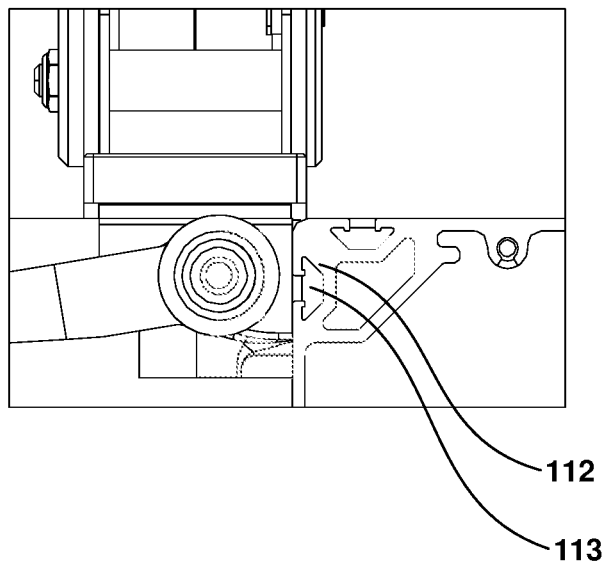

In an embodiment, the attachment provisions 112 are provided in the form of slots, and/or rails, or any other suitable forms such as straps, etc, to facilitate attachment of the implements/attachments 120-128. One or more fasteners 113 may be used for attaching the implements/attachments 120-128 to the chassis 102 utilizing attachment provisions 112. FIGS. 1 and 4 particularly show vehicle 100 with slots and rail provided as attachment provisions 112, whereas the vehicle 100 in FIGS. 2-3 typically shows the presence of slots for mounting the implements using suitable fasteners. The slots 112 provided can be used to mount different implements 120-128 utilizing different sorts of fasteners (E.g. nut and bolt, screws). Likewise, the rail 112 provided may also be used to hook on and optionally slide various implements 120-128. In an embodiment, the rails 112 are provided at two sides 102g of chassis 102, and can be utilized to mount footsteps 123 (or other suitable implements) on either side 102g of the vehicle 104. Further in an embodiment, the rails 112 allows the chassis 102 to change wheelbase as seen in FIGS. 10-11. Referring to FIGS. 12 and 13, the sectional views taken illustrate a mechanism for changing the wheelbase length of the chassis, in accordance with an exemplary embodiment. The four wheels 105-108 are connected to the chassis 102 on the sides 102g utilizing respective control arms (105a,105b) or (106a,106b) or (107a,107b) or (108a,108b). Each of these pairs of control arms 108a and 108b are connected to rails utilizing rail nuts and bolts 113. In operation, when the operator desires to change the wheelbase of the chassis, the user can simply loosen the bolt 113 (provided with the control arm) to disengage it from the rail nut 113 disposed within the rail 112 and slide the control arm pair to the desired distance and retighten the control arm bolt 113 with the rail nut 113 together to retain the position of the wheel. This helps in changing the wheelbase length of the vehicle 100. In some embodiments, where the wheelbase length change is not desired, one can also connect the control arms by utilizing slots 112 provided on the sides of chassis 102 using a nut and bolt pair instead of using rails 112 and rail nut and bolt.

The attachment provisions 112 provided on and around chassis 102 helps in transforming the vehicle 100 into one or more useful vehicle types for various uses as best seen in FIGS. 18-26. This makes the proposed vehicle versatile and widely acceptable. The useful vehicle types may consist of but are not limited to an ATV, a UTV, a micro car, a golf cart, a club cart, an electric wheel barrel, an electric dumper, and a micro truck. The one or more attachments 120-128 may consist of but are not limited to one or more seats 120, at least one bumper 121, one or more fenders for front and rear uses 122, one or more footsteps 123, at least one container 124 for carrying loads, a snowplow 125 for snow removal, a micro car body 126 for urban commuting, a lawn or field mower 127 for agricultural use, and a stretcher 128 for emergency evacuation.

Figure 18:
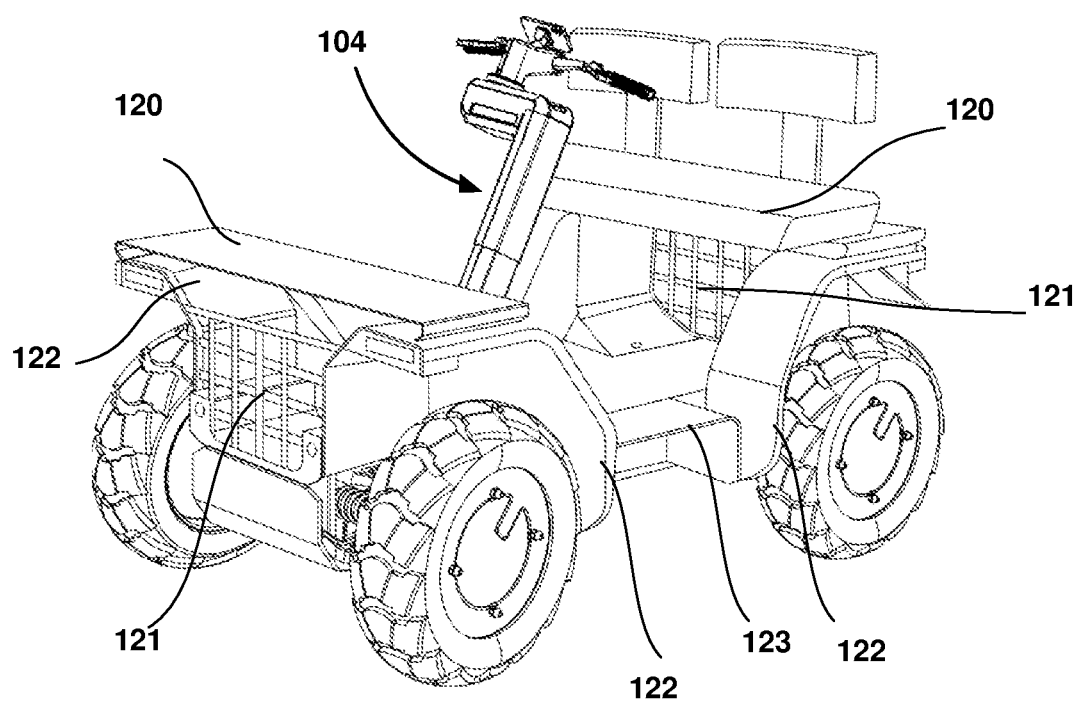
FIGS. 18-26 shows the four-wheeled mobile platform vehicle of FIGS. 2 and 3 transformed into various forms of useful vehicle types for carrying out different works, according to various embodiments of the present invention.
Figure 22:
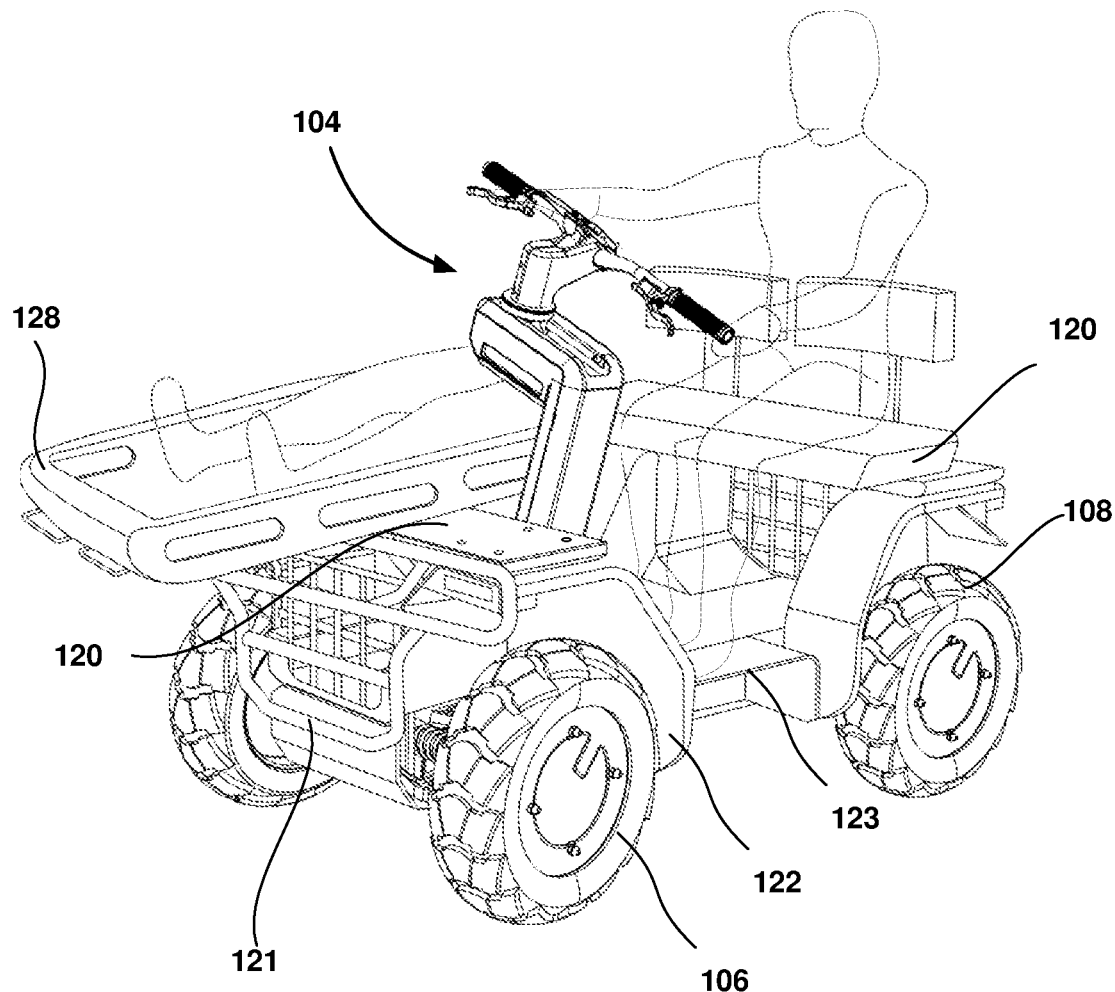

FIG. 18 shows a transformed vehicle by connecting fenders 122 to the front and back of the vehicle 100, a pair of bumpers 121 (that may fold or unfold) connected to the front and back of the vehicle 100, and the footsteps 123 to the sides 102d of the vehicle 100. These implements are connected utilizing the attachment provisions or points 112 provided on the chassis 102 using suitable fasteners 113. The ability to connect various implements to the vehicle 100 potentially allows a user of the vehicle to use the vehicle 100 for different purposes. Tilting the steering assembly 104 and sliding the handlebar 104f to the left (although the handlebar 104f is shown centerline), and mounting seats 120 on top of the back fenders 122 allows the user to use the vehicle 100 in a seated position. In this configuration, the transformed vehicle may be used as a golfing cart or a UTV. Likewise, the user/operator can additionally mount a stretcher 128 laid on top of the seats 120 mounted over the fenders 122 in the front and back as shown in FIG. 22. This configuration is very useful in disaster-prone areas for carrying out rescue operations.

Figure 19:
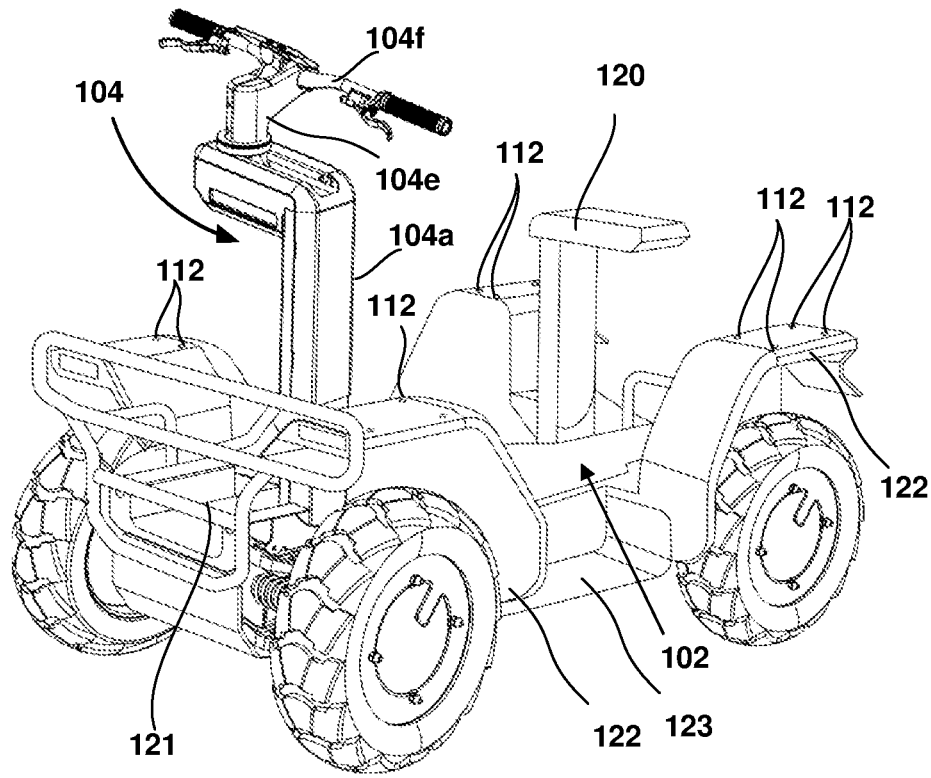

FIG. 19 shows a transformed vehicle by connecting fenders 122 to the front and back of the vehicle 100, a bumper 121 (that may fold or unfold) connected to the front of the vehicle 100, and the footsteps 123 to the sides 102d of the chassis 102. The steering assembly 104 is shown oriented straight (without any tilt) and the handlebar 104f centerline with respect to the chassis 102. Instead of the back seat of FIG. 18, a single operator seat 120 that can be tilted at an angle or folded completely is shown mounted near the rightmost rear wheel 107. The transformed vehicle is similar to conventional ATVs and can be used for normal rides on rough roads or urban roads and the front bumper when unfolded can allow carrying load.

Figure 20:
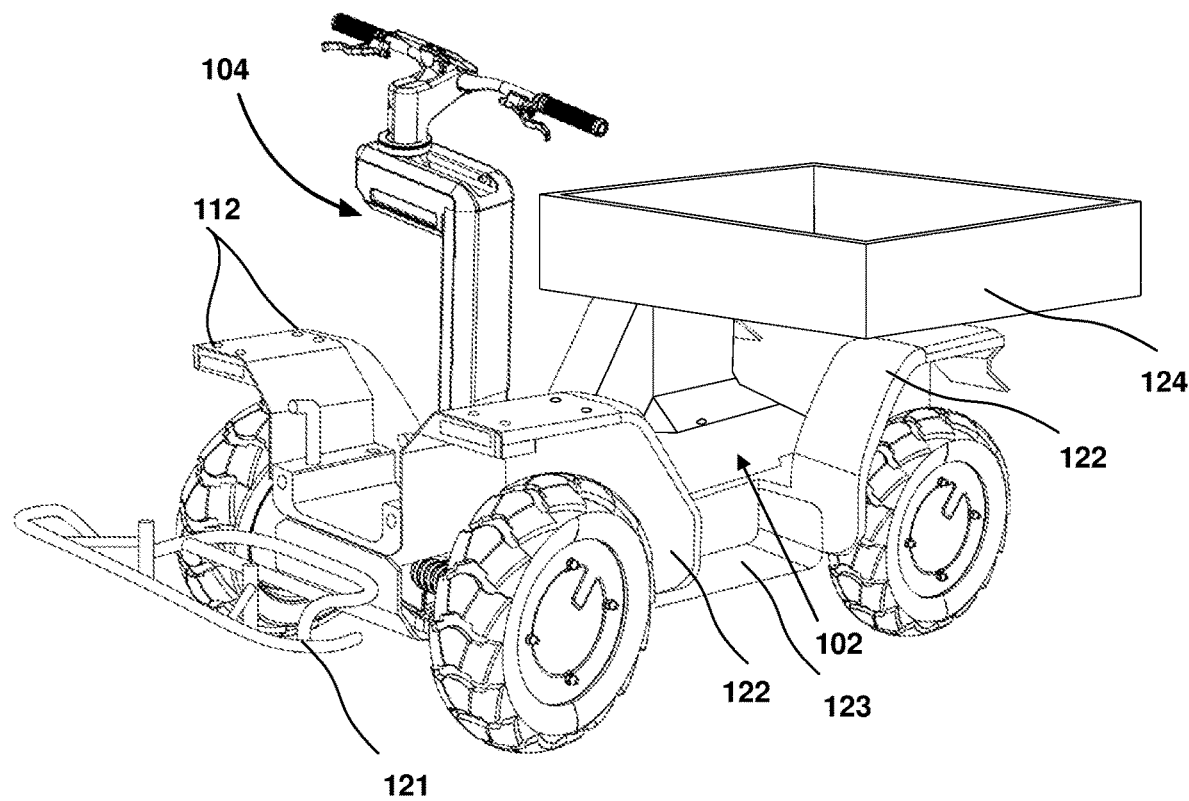
Figure 21:
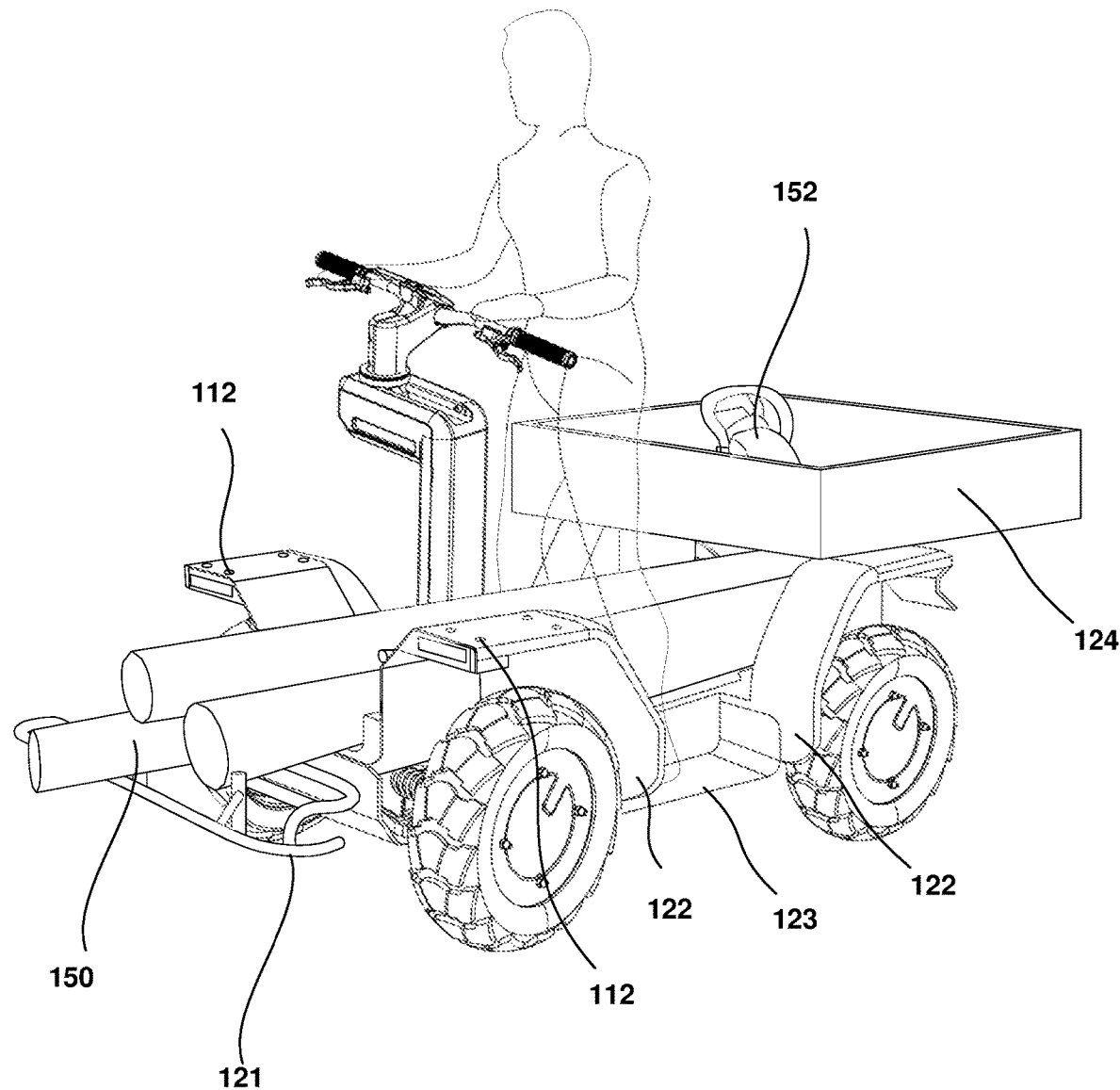

FIG. 20 shows a transformed vehicle by connecting fenders 122 to the front and back of the vehicle 100, a bumper 121 (in an unfolded position) connected to the front of the vehicle 100, and the footsteps 123 to the sides 102d of the chassis 102. In this configuration, there is a container 124 shown mounted on the rear fenders 122 utilizing appropriate attaching provisions 112 provided on fenders 122 at the back and utilizing suitable fasteners. In this configuration, both the container 124 and the foldable bumper can be used for carrying load. The steering is shown configured similar to FIG. 19. FIG. 21 specifically shows a user riding the transformed vehicle in a standing position for carrying long wooden logs 150 placed across the flat deck 102a and carrying a load 152 placed on the container. The flat deck helps in carrying big logs 150 comfortably without any hindrances.

Figure 23:
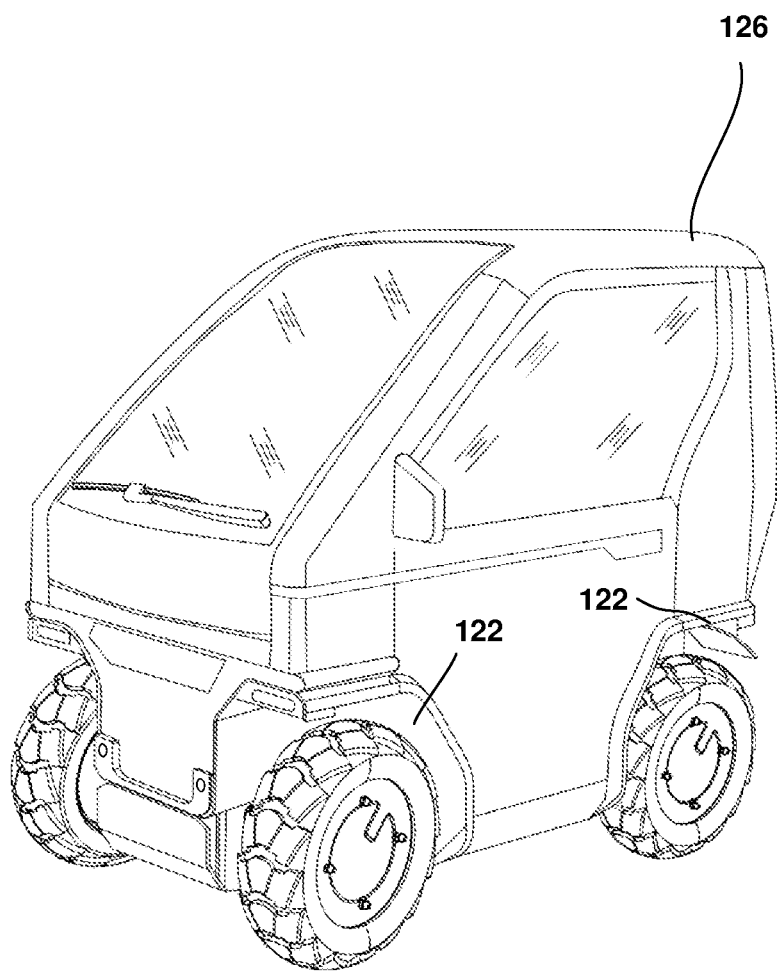
Figure 24:
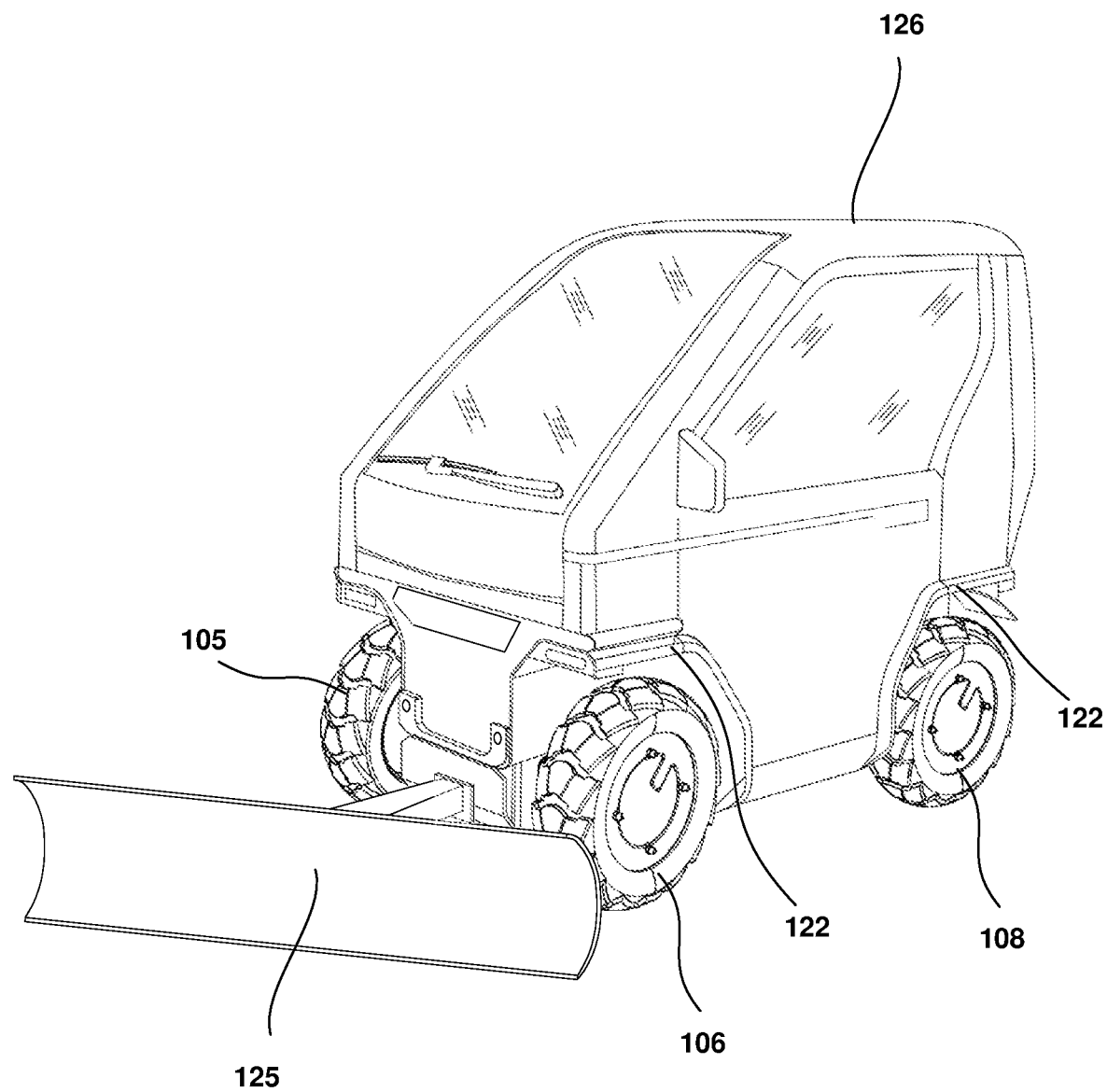

FIG. 23 shows a micro car body 126 configured over the chassis 102 for urban uses. This configuration allows a user (or users) to use the vehicle 100 (as a micro car) in odd weather conditions and commute comfortably in urban areas just like any other small car. The micro car shown in FIG. 23 can be transformed to include a snowplow 125 (as seen in FIG. 24) for the removal of snow from snow-prone areas particularly snow deposited on the public roads.

Figure 25:
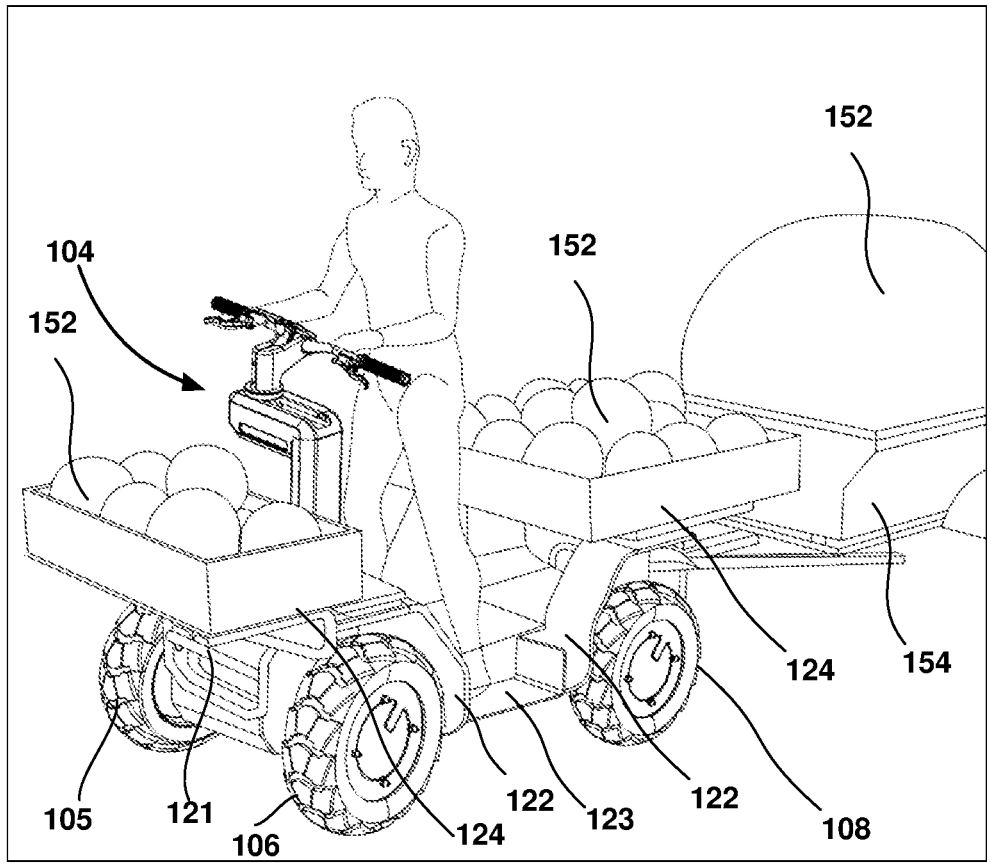

FIG. 25 shows yet another utility aspect of the vehicle 100, wherein vehicle 100 is shown to be capable of carrying load 152 in the front and back like trucks. The vehicle 100 embodies container 124 placed over the fenders 122 (using attachment provisions provided thereon and using fasteners 113) in the front and back. Further, any other cart/lorry 154 (capable of carrying load 152) can be towed using the vehicle 100 by connecting the cart/lorry at the back end 102f of the vehicle chassis 102 utilizing the attaching provisions 112 and suitable fastener 113.

Figure 26:
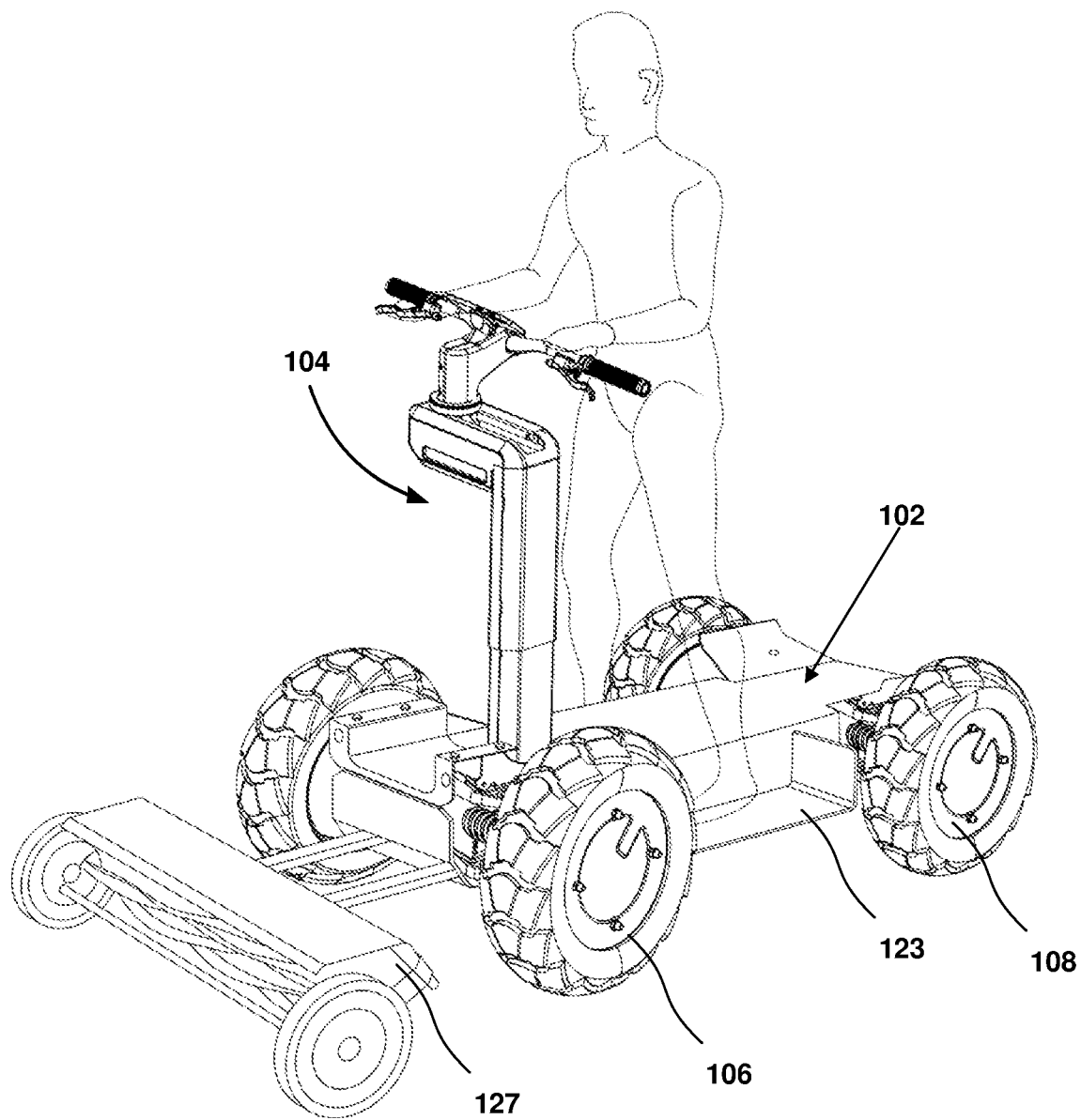

FIG. 26 shows yet another utility aspect of the vehicle 100, wherein the vehicle 100 is shown configured as in FIG. 3 except an agricultural implement/attachment 127 being attached to the front of the chassis 102. The attachment 127 is a lawn or field mower 127 used for agricultural uses for moving the field. The user is seen riding the vehicle 100 in a standing position just like an ATV.

FIGS. 18-26 merely illustrates some exemplary transformations that can be derived from the vehicle 100 by adding in or removing different attachments. There can be numerous other possible configurations that can be envisioned utilizing the vehicle 100 to convert the vehicle 100 to a vehicle that may be useful for some specific purpose. Depending upon the user's requirement, the user can add or remove one or other implements for various purposes/uses.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

What is claimed is:

1. A versatile, modular, and stackable four-wheeled mobile platform vehicle or UPT (100), comprising:
    a chassis (102) comprising a substantially flat deck (102a) with a top surface (102b), and a plurality of flat suspension systems (109), the chassis (102) further comprises an in-built compartment (102c) for housing at least one battery module (103) therein, and wherein the chassis (102) allows mounting of at least one seat (120) in a plurality of seating configurations;
    a steering assembly (104) comprising a steering column (104a), and a handlebar (104f) mounted on the steering column (104a), wherein the steering column (104a) is configured to be selectively used in a first configuration, a second configuration, or a third configuration, and wherein the handlebar (104f) is positionable at least at a centreline of the chassis (102), or to a left side of the chassis (102) of the vehicle (100);
    one or more attachment provisions (112) provided on and around the chassis (102) for removably attaching one or more attachments (120-128) thereon, wherein the one or more attachments (120-128) when coupled to the one or more attachment provisions (112) provided on and around the vehicle (100) transforms the vehicle (100) into one or more useful vehicle types; and
    wherein, each of the four wheels (105-108) comprises an in-wheel motor and is motor-controlled, and coupled to the chassis (102) to support the chassis (102) for rolling on a surface using a pair of control arms ((105a,105b) or (106a,106b) or (107a,107b) or (108a,108b)).

2. The versatile and stackable four-wheeled vehicle or UPT of claim 1 further comprising a cover (102d) for covering the in-built compartment (102c) holding the at least one battery module (103).

3. The versatile and stackable four-wheeled vehicle or UPT of claim 1, wherein the chassis (102) is substantially cuboidal in shape.

4. The versatile and stackable four-wheeled vehicle or UPT of claim 1, wherein the first configuration allows the steering column (104a) to be tilted at a predefined angle for a seated position ride of the vehicle (100), the second configuration allows the steering column (104a) to be oriented straight at 90 degrees with respect to the chassis (102) for a standing position ride of the vehicle (100) and the third configuration allows the steering column (104a) to be completely folded for storage or stackability of the vehicle (100).

5. The versatile and stackable four-wheeled vehicle or UPT of claim 1, wherein the suspension system (109) is connected to a control arm (105a, 106a, 107a, 108a) of the pair of control arms ((105a, 105b) or (106a,106b) or (107a,

107b) or (108a,108b)) using a first bracket (105c, 106c, 107c, 108c) at its first end and to a second bracket (102h) positioned inside and substantially at the centreline of the chassis (102).

6. The versatile and stackable four-wheeled vehicle or UPT of claim 1, wherein the handlebar (104f) is mounted on the steering column (104a) using a carriage (104p) slidable along a rail (104q) internally mounted within the steering column (104a).

7. The versatile and stackable four-wheeled vehicle or UPT of claim 1, wherein
    the steering column (104a) is height adjustable, and comprises a plurality of U-joints (104h-104j), and a plurality of shafts (104k-104m) operationally connected to a third bracket (110) which in turn is connected to a tie rod (111) for transferring the steering motion to the wheels (105-108); and
    the steering column (104a) is configured to operate in the first configuration, and/or the third configuration at a pivotal connection (1040).

8. The versatile and stackable four-wheeled vehicle or UPT of claim 7, wherein
    a shaft (1041) of the plurality of shafts (104k-104m) is selectively slidable into a barrel (104n) for adjusting the height of the steering column (104a); and
    a shaft (104k) of the plurality of shafts (104k-104m) is angularly oriented and operationally connected to the carriage (104p) for moving the carriage (104p) along the rail (104q) within the steering column (104a).

9. The versatile and stackable four-wheeled vehicle or UPT of claim 7, wherein the pivotal connection (1040) selectively aligns with a U-joint (104j) of the plurality of U-joints (104h-104j) to tilt the steering column (104a) at the predefined angle for seated position ride of the vehicle (100) or completely folded for storage or stackability of the vehicle (100).

10. The versatile and stackable four-wheeled vehicle or UPT of claim 1, wherein the steering assembly (104) is removably mounted on an upper control arm (106b) of the pair of control arms (106a,106b) coupled to the chassis (102) of the vehicle (100).

11. The versatile and stackable four-wheeled vehicle or UPT of claim 1, wherein the one or more attachment provisions (112) are provided in the form of at least slots, and/or rails to facilitate attachment of the one or more attachments (120-128) using one or more fasteners (113).

12. The versatile and stackable four-wheeled vehicle or UPT of claim 1, wherein the one or more useful vehicle types are selected from a group of vehicles consisting of an ATV, a UTV, a micro car, a golf cart, a club cart, an electric wheel barrel, an electric dumper, and a micro truck.

13. The versatile and stackable four-wheeled vehicle or UPT of claim 1, wherein the one or more attachments (120-128) are selected from a group of attachments consisting of at least one seat (120), at least one bumper (121), one or more fenders for front and rear uses (122), one or more footsteps (123), at least one container (124), a snowplow (125), a micro car body (126), a lawn or field mower (127), and a stretcher (128).

14. The versatile and stackable four-wheeled vehicle or UPT of claim 13, wherein the one or more attachments (120-128) are at least foldable and/or removable to facilitate in folding and stacking of the vehicle (100).

15. The versatile and stackable four-wheeled vehicle or UPT of claim 1, wherein the chassis (102) is configured such that the wheelbase of the vehicle (100) can be varied.

16. The versatile and stackable four-wheeled vehicle or UPT of claim 1, wherein the at least one battery module (103) comprises up to eight battery modules.

17. The versatile and stackable four-wheeled vehicle or UPT of claim 1, wherein the suspension system (109) is configured near each of the four wheels (105-108) substantially in a horizontal orientation.

18. The versatile and stackable four-wheeled vehicle or UPT of claim 1, wherein each of the suspension systems (109) is configured to connect the two front wheels together and the two rear wheels together to facilitate tilt steering in the vehicle (100) substantially similar to that offered by an in-line two-wheeled vehicle.

\* \* \* \* \*